(12) United States Patent
Chisu et al.

(10) Patent No.: US 12,132,543 B2
(45) Date of Patent: Oct. 29, 2024

(54) DEVICE-CONTROLLED TRANSMIT CHAIN CONFIGURATION FOR HIGH POWER MODES

(71) Applicant: MOTOROLA MOBILITY LLC, Wilmington, DE (US)

(72) Inventors: Daniel C Chisu, Franklin Park, IL (US); Armin W Klomsdorf, Chicago, IL (US)

(73) Assignee: Motorola Mobility LLC, Chicago, IL (US)

(*) Notice: Subject to any disclaimer, the term of this patent is extended or adjusted under 35 U.S.C. 154(b) by 67 days.

(21) Appl. No.: 18/050,922

(22) Filed: Oct. 28, 2022

(65) Prior Publication Data

US 2024/0146367 A1    May 2, 2024

(51) Int. Cl.
*H04L 27/04* (2006.01)
*H04B 7/06* (2006.01)
*H04L 27/12* (2006.01)
*H04L 27/20* (2006.01)

(52) U.S. Cl.
CPC ..................... *H04B 7/06* (2013.01)

(58) Field of Classification Search
CPC ....... H04B 7/06; H04B 7/0693; H04B 7/0404
USPC ......................... 375/260, 267, 299
See application file for complete search history.

(56) References Cited

U.S. PATENT DOCUMENTS

| 8,681,809 B2 * | 3/2014 | Sambhwani | H04B 7/0404 370/431 |
| 9,048,913 B2 * | 6/2015 | Kludt | H04B 7/0693 |
| 2008/0151798 A1 * | 6/2008 | Camp | H04B 7/0693 370/342 |

* cited by examiner

*Primary Examiner* — Phuong Phu
(74) *Attorney, Agent, or Firm* — Isidore PLLC

(57) ABSTRACT

A communication device, method, and computer program product reduce power consumption when one or more transmit chains can be inactivated without unsatisfactory uplink communication quality in single data layer transmit diversity (TxDiv) or multiple input multiple output (MIMO) mode. The communication device monitors uplink signal quality of the uplink data stream while connected in single layer mode to a base node using multiple transmit chains. The controller device deactivates transmit chain(s) while the uplink signal quality remains satisfactory. The controller re-activates the inactivated transmit chain(s) in response to the uplink signal quality becoming unsatisfactory.

20 Claims, 10 Drawing Sheets

DEVICE-CONTROLLED TRANSMIT CHAIN CONFIGURATION FOR HIGH POWER MODES

BACKGROUND

1. Technical Field

The present disclosure relates generally to a communication device that supports simultaneous transmissions, and more particularly to a communication device that supports simultaneous transmissions using more than one transmit chain for a high-power mode.

2. Description of the Related Art

Communication devices are increasingly being designed to support concurrent transmission via more than one transmit chain. For example, in moving from fourth generation long term evolved (LTE) radio access technology (RAT) to fifth generation new radio (5G NR) RAT, communication devices typically have increased a number of transmit chains that operate simultaneously. A typical LTE communication device has a maximum of two transmitters that are simultaneously active, one LTE transmitter and one Wi-Fi transmitter. A 5G NR communication device can have up to two 5G NR transmitters in multiple input multiple output (MIMO) operation, one LTE transmitter, and two Wi-Fi transmitters in MIMO operation. 5G non-standalone (NSA) mode is an option for 5G NR deployment. NSA mode is also referred to as evolved UMTS radio access network and new radio dual connectivity (ENDC) or merely "dual connectivity". Dual connectivity refers to possible concurrent transmission by an LTE transmitter and by a 5G NR transmitter. The multiple transmit chains may also be operated for spatial diversity, selecting antennas that are not blocked by proximity of the antennas to a user's body or vice versa.

A new 29 dBm higher power class (PC) 1.5 is introduced for new radio standalone (NR SA) and for intraband ENDC that require two active transmitters for one of four modes: (i) Mode "A": Transmit Diversity (TxDiv) having one (1) uplink (UL) layer; (ii) Mode "B": UL MIMO uplink full power (ULFP) Transmit Mode 1 having one (1) UL layer; (iii) Mode "C": UL MIMO having two (2) UL layers; and (iv) Mode "D": UL MIMO with one UL layer. Multiple transmit chains are always active in these modes in an attempt to achieve the desired transmit power. However, in some instances, improved communication performance may not be achieved. In an example, signal cancellation may occur depending on antenna and channel correlation when using either of Modes A or B. The signal cancellation may negate any benefit from transmitting more than one transmit channel and may even lead to throughput reduction. For all three of Modes A, B and C, using more than one transmit chain may result in elevated current drain. When stored battery power is low, any communication performance sought by using more than one transmit chain may be less important than being able to communicate for a longer period. Thus, higher power class operation may not always bring significant benefits to uplink communication quality or user experience.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
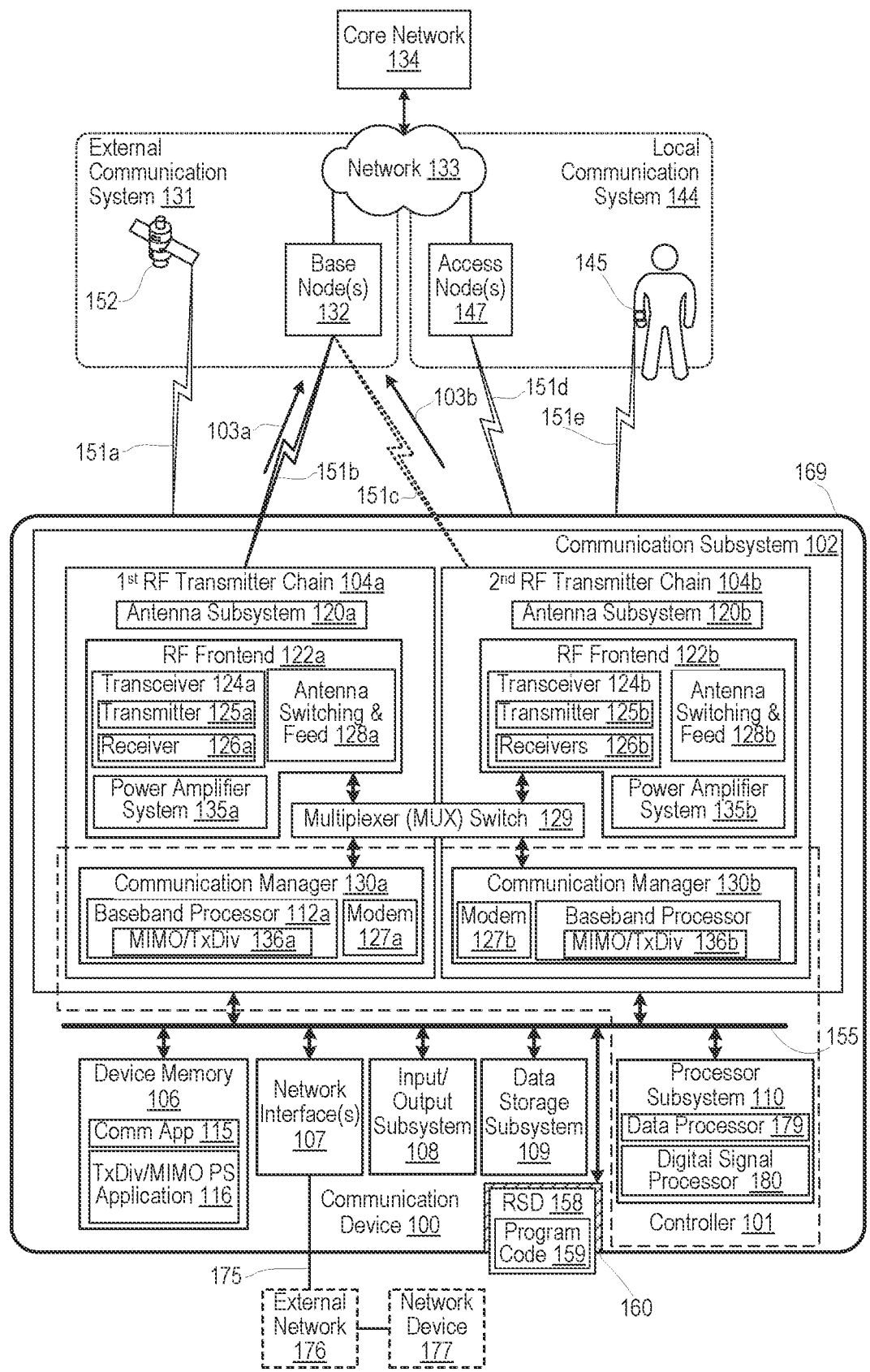
FIG. 1 depicts a functional block diagram of a communication environment including a communication device having a communication subsystem that supports multiple transmission uplinks that are configurable for power efficient transmit diversity, according to one or more embodiments.

According to a first aspect of the present disclosure, a communication device, a method and a computer program product provide power consumption reductions while avoiding unsatisfactory uplink signal quality when communicating using multiple transmit chains in higher frequency bands. In one or more embodiments, the communication device includes a communications subsystem having more than one transmit chains, including at least a first transmit chain and a second transmit chain. The more than one transmit chains are configurable to perform one of transmit diversity (TxDiv) mode and multiple input multiple output (MIMO) mode. A controller is communicatively coupled to the communications subsystem. The controller configures the communications subsystem in a first configuration to communicate an uplink with a base node in a single layer mode of an uplink data stream using at least the first and the second transmit chains. The controller monitors at least one of a direct or an indirect measure of uplink signal quality of the uplink data stream while connected to the base node in the single layer mode via at least the first and the second transmit chains. In response to the measure of uplink signal quality indicating satisfactory signal quality, the controller deactivates one or more of the transmit chains, leaving at least one transmit chain active in a second configuration. In response to the measure of uplink signal quality indicating unsatisfactory signal quality after deactivating the one or more transmit chains, the controller re-activates the one or more of the transmit chains that were inactivated to return to the first configuration.

An application executed by a controller of the communication device may require a single layer of an uplink. Another application executed by a controller of the communication device may require another layer of an uplink resulting in more than one layer supported by the transmit chains. Each application may have a different priority, enabling deferring of communication when too many applications have data to communicate for a communication capacity of the communication device. The transmit chains may be used to support TxDiv for increased total transmit power for an uplink or may be operated in MIMO for multiple path advantages.

Four (4) particular modes of transmission for supporting data layer are discussed below in triggering aspects of the present disclosure. First of the four, designated as Mode "A" herein, is single layer TxDiv with a maximum rank of "1". TxDiv is radio communication using signals that originate from two or more independent sources that have been modulated with identical information-bearing signals and that may vary in their transmission characteristics at any given instant. TxDiv can help overcome the effects of fading, outages, and circuit failures. When using diversity transmission and reception, the amount of received signal improvement depends on the independence of the fading characteristics of the signal as well as circuit outages and failures. Considering antenna diversity, in many systems, additional antennas may be expensive or impractical to incorporate at a user device or even at the base station. In these cases, TxDiv can be used to provide diversity benefit at a receiver with multiple transmit antennas only. With transmit diversity, multiple antennas transmit delayed versions of a signal, creating frequency-selective fading, which is equalized at the receiver to provide diversity gain. Although Mode A may be used in low, moderate or high pathloss scenarios, Mode A is typically used in higher pathloss scenarios.

Modes B, C and D, as referred to and discussed herein, are for MIMO operation. In radio, MIMO is a method for multiplying the capacity of a radio link using multiple transmission and receiving antennas to exploit multipath propagation. Conventional usage of MIMO specifically refers to a practical technique for sending and receiving more than one data signal simultaneously over the same radio channel by exploiting multipath propagation. Although the multipath phenomenon may be interesting, it is the use of orthogonal frequency-division multiplexing (OFDM) to encode the channels that is responsible for the increase in data capacity. MIMO is fundamentally different from smart antenna techniques developed to enhance the performance of a single data signal, such as beamforming and diversity.

Specifically, Mode B refers to single layer MIMO using uplink full power transmission (ULFPTx) Mode 1, maximum rank of 1. Mode C refers to UL MIMO with two uplink layers with maximum rank "2". Mode D refers to single layer and maximum rank 2. Although Modes B, C and D may be used in low, moderate or high pathloss scenarios, Mode B is typically used in higher pathloss scenarios. Mode C is typically used in lower pathloss scenarios. Mode D is typically used in moderate pathloss scenarios.

As described herein, aspects of the present disclosure may depend on target power regions in which Modes A, B, C, and D are being used. Region "1" is when target power is greater than an individual transmit power (TxPwr) capability of each chain. For power class (PC) 1.5, target power is greater than 26 dBm. Conversely, Region "2" is when target power is equal to or less than the individual TxPwr capability for each chain. In an example, a category of PC 1.5 may benefit from deactivating one or more transmit chains. Recently defined PC 1.5 doubles the transmit power over a previously defined PC 2 and quadruples power over PC 3 ("normal power"). PC 1.5 can theoretically get 41% better range than PC 2 and double the range of PC 3 for an uplink. Although Modes A, B, C and D may be used in both Regions 1 and 2, typically Modes A and B are used in Region 1 and Modes C and D are used in Region 2.

In a first aspect of the present disclosure, the communication device addresses opportunities for power conservation by mobile devices of higher power class, such as PC 1.5, that require two active transmitters, such as when operating in a single data layer of Modes A, B or D. The specific mention of PC 1.5 is provided as one example. The present disclosure applies to other power classes now specified or defined in the future that require two active transmitters. Although the transmit chains are conventionally always active in these modes, a significant benefit to uplink quality or user experience may not be realized over what may be accomplished with deactivating one or more transmit chains. In one aspect, an entry point for using the present disclosure is thus a PC 1.5 device or a communication device with multiple transmit chains active, in radio resource control (RRC) connected mode with the network, while operating in single layer mod and using low UL resource block (RB)/grant below a power headroom (PHR) threshold. The communication device does not need transmit PHR for data.

In the first aspect, the communication device probes which transmit chains can be turned off or placed in low power mode (LPM) and then does so by executing the following steps 1-3:

(1) Loop through all of the transmit chains and, for a short time temporarily (e.g., a few frames and on a frame boundary), turn off one of the other active transmit chains and monitor transmit power control (TPC) UP command bits from a network. The UP commands are power control commands prompting the communication device to increase transmit power.

(2) If no continuous UP command bits are received, then the indication is that the uplink signal as viewed by the base node is satisfactory. Communication device may continue communicating the uplink with inactivated transmit chain(s) remaining inactivated.

(3) The communication device continues cycling through all transmit chains as described above in steps 1 and 2 without turning off all transmit chains until an increase in TCP-UP bits is detected, where the communication device does not inactivate further transmit chains.

While in the state of inactivated transmit chains, the communication device conserves battery charge. However, the communication device monitors conditions such as uplink signal quality for triggers that warrant re-activating the inactivated uplink transmit chains to maintain satisfactory communication levels. In an example, the communication device immediately turns on all disabled or low power mode (LPM) transmit chains for recovery based on the following conditions: (i) continuous TPC-UP bits are observed; (ii) communication device cannot decode TPC bits in downlink (DL); (iii) communication device exits single layer (1L) TxDiv mode and enters dual layer UL MIMO mode; (iv) RB/grant allocation increases; or (v) a higher Quality of Service (QoS) begins to be used. Alternatively, or in addition to using TPC-UP bits as a key performance indicator (KPI) to determine UL signal "goodness", the communication device may indirectly measure or infer uplink signal quality or goodness based at the following upper layers: (i) radio link control (RLC) layer: packet data unit (PDU) retransmit or drop rate or acknowledged/not acknowledged (ACK/NACK) ratio; (ii) packet data convergence protocol (PDCP) layer: service data unit (SDU)/PDU discard rate; and/or (iii) Internet protocol (IP) layer: transport control protocol (TCP) retransmit rate; jitter; user datagram protocol (UDP) packet drops; throughput degradation, and/or latency increase.

In a second aspect of the present disclosure, the communication device addresses opportunities for power conservation when involved in two or more layers of uplink MIMO communications. As an entry point for this aspect, a communication device has multiple transmit chains active in RRC-connected mode in UL MIMO mode with dual layers (2L). Communication device is using lower uplink RB/grant below a PHR threshold for which the communication device does not need power PHR for data. The communication device may attempt to conserve battery charge when a battery charge level is low, no critical application is using the connection, and no MIMO communication benefit is being realized due to a highly congested or faded area due to radio frequency (RF) or backhaul conditions. In an example, the communication device infers RF congestion based on monitoring pilot pollution indicated by strong total channel power but weak recovered energy. The communication device may infer backhaul congestion is inferred based on monitoring Internet Protocol (IP) packet segmentation levels relative to the maximum transmission unit (MTU).

In one or more embodiments, the communication device may additionally signal to the base node of the network indicating user equipment (UE) capability for uplink single input single output (SISO) support rather than capability for MIMO. In one or more embodiments, the communication device may additionally signal to the base node of the network indicating downgrade of power class from PC 1.5 to PC 2 until above conditions improve.

The communications device immediately turns on all disabled/LPM chains for recovery based on one or more of the following conditions: (i) battery charge level is "good" again; (ii) a critical application is using the connection; (iii) device exits MIMO mode and enters 1L mode; (iv) resource block (RB) grant allocation increases; or (v) higher quality of service (QoS) is being used.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device in an operating environment within which the features of the present disclosure are advantageously implemented. In particular, communication device 100 is an example of an electronic device having communication subsystem 102 that supports multiple transmission uplinks 103*a*-103*b* by a plurality of radio frequency (RF) transmit chains 104*a*-104*b* configurable for transmit diversity or MIMO modes in either a single data layer or a two or more data layer mode. For clarity, first and second transmit chains 104*a*-104*b* are depicted; however, communication device 100 can include more than two RF transmit chains 104*a*-104*b*. In addition, the plurality of RF transmit chains 104*a*-104*b* can include different subsets that support concurrent transmission on different communication frequency bands. Communication device 100 may perform transmit diversity in two or more different communication frequency bands.

Communication device 100 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In addition to communication subsystem 102, communication device 100 includes controller 101, device memory 106, network interface(s) 107, input/output (I/O) subsystem 108, and data storage subsystem 109 that are each managed by controller 101. Controller 101 may include or consist essentially of processor subsystem 110. In one or more embodiments, controller 101 also includes one or more baseband processors 112a-112b of respective RF transmit chains 104a-104b. Device memory 106 stores program code for applications, such as communication application 115, TxDiv/MIMO power saving (PS) application 116, and other application(s). Device memory 106 further includes an operating system (OS), a firmware interface, such as basic input/output system (BIOS) or Uniform Extensible Firmware Interface (UEFI), and firmware.

Controller 101 includes processor subsystem 110, which executes program code to provide operating functionality of communication device 100. The functionality includes configuring communication subsystem 102 for transmit diversity (TxDiv) or MIMO to support increased transmit power or increase antenna efficiency, when necessary, and configuring communication subsystem 102 for fewer transmit chains for power efficiency when satisfactory uplink signal quality is achievable. The software and/or firmware modules have varying functionality when their corresponding program code is executed by processor subsystem 110 or secondary processing devices within communication device 100. Processor subsystem 110 of controller 101 can execute program code of communication application 115, TxDiv/MIMO PS application 116 and other application(s) to configure communication device 100 to perform specific functions. Device memory 106 can include data used by the applications. TxDiv/MIMO PS application 116 monitors communication application 115 to determine what transmit uplinks are scheduled. Controller 101, executing TxDiv/MIMO PS application 116, can configure communication subsystem 102 in transmit diversity mode or MIMO for single data layer or multiple data layer, operating at least first and second transmit chains 104a-104b. Controller 101, executing TxDiv/MIMO PS application 116, can also configure communication subsystem 102 in another mode that uses fewer transmit chains, such as deactivating either of first or second transmit chains 104a-104b.

Each RF transmit chain 104a-104b of communication subsystem 110 includes respective antenna subsystems 120a-120b that support various RF bands for wireless and cellular services. To support newer radio access technologies (RATs) and multi band operation, antenna subsystems 120a-120b may be configured for dual low band (2L) or quad low band (4L) multiple input multiple output (MIMO) operation that dictates that multiple antennas communicate on multiple bands simultaneously. In one or more embodiments, antenna subsystems 120a-120b supports lower frequency bands such as ultra-high band (UHB) and higher frequency bands, such as millimeter Wave (mmWave).

Each RF transmit chain 104a-104b includes respective RF frontends 122a-122b having one or more transceivers 124a-124b that includes one or more transmitters 125a-125b and one or more receivers 126a 126b. Multiplexer (MUX) switch 129 selectively connects communication managers 130a-130b to RF frontends 122a-122b. In one configuration, MUX switch 129 connects communication manager 130a to RF frontend 122a and connects communication manager 130b to RF frontend 122b, such as for uplink transmissions. In another configuration, MUX switch 129 connects either communication manager 130a to RF frontend 122a or connects communication manager 130b to RF frontend 122b with the other being inactive when not needed for transmit diversity or multiple independent transmissions. In an additional configuration, such as for TxDiv, MUX switch 129 connects one of communication managers 130a-130b to both RF frontends 122a-122b with the other communication manager 130a-130b being inactive. Each RF transmit chain 104a-104b includes respective ones of one or more modems 127a-127b. Each RF transmit chain 104a-104b respectively includes antenna switching and feed network 128a-128b respectively to connect particular antennas of antenna subsystems 120a-120b at a selected phase delay. Power amplifier systems 135a-135b for respective RF frontends 122a-122b set the transmit power levels provided to antennas connected by antenna switching and feed network 128a-128b.

Each RF transmit chain 104a-104b includes respective communication manager 130a-130b having corresponding baseband processor 112a-112b. Baseband processors 112a-112b communicates with controller 101 and respective RF frontend 122a-122b. In one or more embodiments, baseband processor 112a-112b performs a primary or support function as part of controller 101. Communication subsystem 102 communicates with external communication system 131. Baseband processors 112a-112b operate in baseband frequency range to encode data for transmission and decode received data, according to a communication protocol. Baseband modems 127a-127b modulate baseband encoded data from corresponding communication managers 130a-130b onto a carrier signal to provide a transmit signal that is amplified by power amplifiers in transmitters 125a-125b and delivered to antennas. Baseband modems 127a-127b are respectively configured with MIMO/TxDiv components 136a-136b encode uplink signals and decode downlink signals that are communicated using MIMO or TxDiv. Baseband modems 127a-127b demodulate received signals from external communication system 131 detected by corresponding antenna subsystem 120a-120b. The received signal is amplified and filtered by receivers 126a 126b, which demodulate received encoded data from a received carrier signal. In an example, communication subsystem communicates with cellular network or base nodes 132 that are part of one or more radio access network (RANs) to connect to communication network(s) 133. Communication network(s) 133 may be communicatively connected to core network 134.

In other applications, local communication system 144 can include localized or personal devices 145, such as a wireless headset, head mounted display, and a smart watch. Local communication systems 144 can further include access nodes 147 for wireless communication. Communication devices 100 can be provided communication services by wide area network(s) that are part of external communication system 131 and linked to access nodes 147. Wide area network(s) may also provide data services to communication network(s) 133 that provide communication service to communication device 100 via base nodes 132.

Communication subsystem 102 can concurrently transmit multiple uplink channels and receive multiple downlink channels. In an example, communication subsystem 102 receives satellite broadcast signals 151a from GPS satellites 152. Communication subsystem 102 communicates with base nodes 132 via uplink/downlink channels 151b-151c. Communication subsystem 102 can communicate with access node 147 via transmit/receive signals 151d. Communication subsystem 102 communicates with localized or personal device 145 via transmit/receive signals 151e.

In one or more embodiments, controller 101, via communication subsystem 102, performs multiple types of cellular OTA or wireless communication with external communication system 131. Communication subsystem 110 can communicate via Bluetooth connection with one or more personal access network (PAN) devices such as localized or personal devices 145. Communication via Bluetooth connection includes both transmission and reception via a Bluetooth transceiver device. In one or more embodiments, communication subsystem 102 communicates with one or more locally networked devices via a wireless local area network (WLAN) link provided by access node 147. In one or more embodiments, access node 147 supports communication using one or more IEEE 802.11 WLAN protocols. Access node 147 is connected to wide area network(s), such as the Internet. In one or more embodiments, communication subsystem 102 communicates with GPS satellites 152 to obtain geospatial location information.

Data storage subsystem 109 of communication device 100 includes data storage device(s). Controller 101 is communicatively connected, via system interlink 155, to data storage device(s). Data storage subsystem 109 provides applications, program code, and stored data on nonvolatile storage that is accessible by controller 101. For example, data storage subsystem 109 can provide a selection of applications and computer data such as TxDiv/MIMO PS application 116. TxDiv/MIMO PS application 116 can be loaded into device memory 106 for execution by controller 101. In one or more embodiments, data storage device(s) can include hard disk drives (HDDs), optical disk drives, and/or solid-state drives (SSDs), etc. Data storage subsystem 109 of communication device 100 can include one or more non-transitory computer readable storage devices or computer readable storage devices, such as removable storage device (RSD) 158 that contains program code 159 and that is received in RSD interface 160. Controller 101 is communicatively connected to RSD 158, via system interlink 155 and RSD interface 160. Controller 101 can access RSD 158 to provision communication device 100 with program code 159, such as code for TxDiv/MIMO PS application 116 and related computer data, that when executed by controller 101 configures computer device 100 to perform functionality described herein.

I/O subsystem 108 includes user interface components such as a display device that presents a user interface. I/O subsystem 108 may include acceleration/movement sensor(s), vibration output device, light output device, image capturing device(s), microphone(s), touch/haptic controls, and audio output device(s). I/O subsystem 108 also may include an I/O controller. The I/O controller provides communication and power signals to functional components described herein as part of communication subsystem 102, device memory 106, I/O subsystem 108, or data storage subsystem 109. The I/O controller connects to internal devices, which are internal to housing 169, and via an electrical cable to tethered peripheral devices, which are external to housing 169 of communication device 100. Internal devices can include computing, storage, communication, or sensing components depicted within housing 169. The I/O controller supports the necessary configuration of connectors, electrical power, communication protocols, and data buffering to act as an interface between internal devices and peripheral devices tethered by the electrical cable and other components of communication device 100 that use a different configuration for inputs and outputs.

Network interface(s) 107 can include a network interface controller (NIC) with a network connection/cable 175 connection to external network 176. Network connection/cable 175 may include wireless and/or wired links. Network interface(s) 107 support one or more network communication protocols. External network 176 can be a local area network (LAN), a campus area network (CAN), a metropolitan area network (MAN), or a wide area network (WAN). For example, network connection/cable 175 can be an Ethernet connection/cable. Network device 177 is communicatively coupled to wired area network 176.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 110, which includes one or more central processing units (CPUs), depicted as data processor 179. Processor subsystem 110 can include one or more digital signal processors 180 that are integrated with data processor 179. Processor subsystem 110 can include other processors that are communicatively coupled to data processor 179, such as baseband processors 112a-112b of corresponding communication managers 130a-130b. In one or embodiments that are not depicted, controller 101 can further include distributed processing and control components that are external to housing 169 or grouped with other components, such as I/O subsystem 108. Data processor 179 is communicatively coupled, via system interlink 155, to device memory 106. In one or more embodiments, data processor 179 is communicatively coupled via system interlink 155 to communication subsystem 102, I/O subsystem 108, and data storage subsystem 109.

System interlink 155 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 155 are illustrated in FIG. 1, it is to be understood that more, fewer, or different interconnections may be present in other embodiments.

According to aspects of the present disclosure, communication subsystem 102 has more than one transmit chains, including at least first transmit chain 104a and second transmit chain 104b. Controller 101 is communicatively coupled to communication subsystem 102. Controller 101 configures communications subsystem 102 in a first configuration to communicate an uplink with base node 132 in a single layer mode of an uplink data stream using at least first and second transmit chains 104a-104b to perform one of transmit diversity (TxDiv) mode and multiple input multiple output (MIMO) mode. Controller 101 monitors at least one of a direct or an indirect measure of uplink signal quality of the uplink data stream while connected to base node 132 in the single layer mode via at least first and second transmit chains 104a-104b. In response to the measure of uplink signal quality indicating satisfactory signal quality, controller 101 deactivates one or more of first and second transmit chains 104a-104b, leaving at least one transmit chain 104a-104b active in a second configuration. In one or more embodiments, controller 101 deactivates one or more of transmit chains 104a-104b by performing one among: (i) turning off at least one transmit chain 104a-104b; (ii) configuring at least one transmit chain 104a-104b to operate in a low power mode; and (iii) reducing a transmit power level of at least one transmit chain 104a-104b. In response to the measure of uplink signal quality indicating unsatisfactory signal quality after deactivating one or more transmit chains 104a-104b, controller 101 re-activates one or more of the transmit chains 104a-104b that were inactivated to return to the first configuration.

In one or more embodiments, controller 101 monitors the direct measure of the uplink signal quality based on transmit power control commands received from base node 132. Controller 101 determines that the direct measure indicates unsatisfactory signal quality based on receiving one or more up commands for transmit power control. In one or more embodiments, controller 101 monitors the indirect measure of the uplink signal quality by tracking one or more among: (i) radio link control (RLC) packet data unit (PDU) retransmit or drop rate; (ii) ratio of acknowledged messages to not acknowledged messages received from the base node; (iii) packet data convergence protocol (PDCP) layer service data unit (SDU)/PDU discard rate; (iv) Internet protocol (IP) layer transport control protocol (TCP) retransmit rate; (v) user datagram protocol (UDP) packet drops; (vi) throughput degradation; (vi) and increase in data latency.

In one or more embodiments, controller 101 re-activates one or more of transmit chains 104a-104b that were previously inactivated to return to the first configuration in response to identifying one or more among: (i) an inability to decode transmit power control commands in a downlink received from base node 132; (ii) transitioning from one layer mode to a two layer uplink MIMO mode; (iii) an increase in resource block grant allocation; and (iv) a change to a higher quality of service (QoS).

In one or more embodiments, controller 101 determines whether communication device 100 is: (i) in a first transmit power region that requires a total transmit power for the uplink being greater than a transmit power capability of each of one or more transmit chains 104a-104b; or (ii) in a second transmit power region that requires the total transmit power for the uplink being equal to or less than the transmit power capability of at least one of transmit chains 104a-104b. Controller 101 deactivates one or more of transmit chains 104a-104b with at least one transmit chain remaining active in response to either: (i) the measure of uplink signal quality indicating unsatisfactory signal quality; or (ii) determining that communication device 100 is in a second transmit power region. In one or more particular embodiments, controller 101 determines the total transmit power required in response to one among: (i) an active resource block allocation; and (ii) a future slot allocation based on a grant received from base node 132.

In one or more embodiments, controller 101 configures communications subsystem 102 in a third configuration to communicate the uplink with base node 132 in more than one layer in performing MIMO mode using at least first and second transmit chain 104a-104b. Controller 101 deactivates one or more of transmit chains 104a-104b, with at least one transmit chain 104a-104b remaining active in a fourth configuration in response to one or more conditions from among: (i) a battery charge level being less than a battery charge level threshold; (ii) a noncritical application using the uplink. In one or more particular embodiments, subsequent to deactivating the one or more of transmit chains 104a-104b while communicating in more than one layer in MIMO mode in the fourth configuration, controller 101 re-activates the one or more of transmit chains 104a-104b to return to the third configuration that were inactivated in the fourth configuration in response to identifying at least one changed condition from among: (i) communications subsystem 102 being reconfigured to communicate the uplink in the single layer mode and in the MIMO mode; (ii) a quality of service (QoS) for the uplink being increased to a higher level; (iii) the battery charge level being equal to or greater than the battery charge level threshold; and (iv) one or more critical applications requiring re-activation of the one or more of transmit chains 104a-104b.

Figure 2:
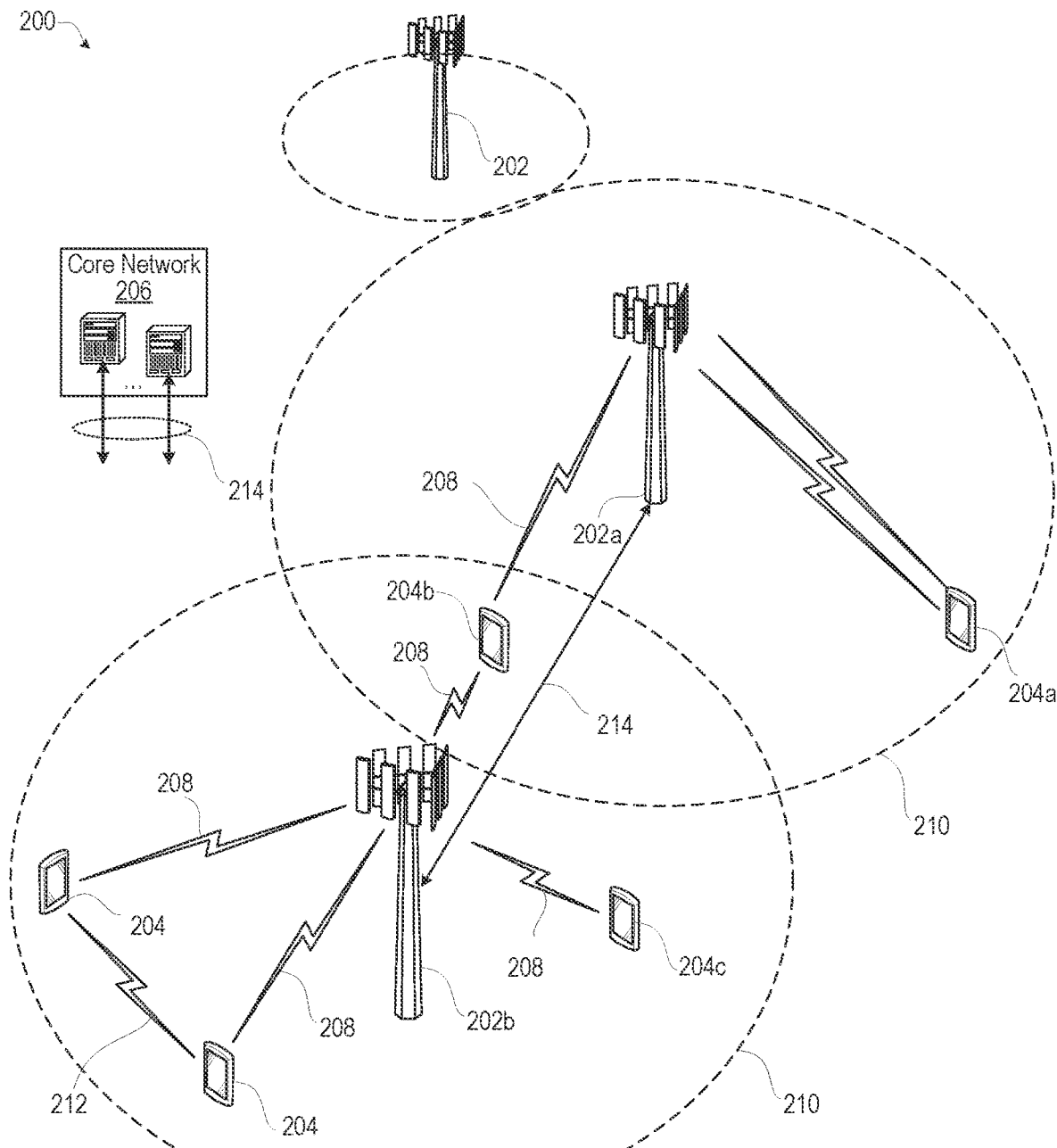
FIG. 2 depicts a wireless communications system that supports power efficient transmit diversity, according to one or more embodiments.

FIG. 2 illustrates an example of wireless communications system 200 that supports power efficient transmit diversity in accordance with aspects of the present disclosure. Wireless communications system 200 may include one or more base nodes 202, one or more user equipments (UEs) 204a, 204b, and 204c (collectively "204"), and core network 206. Wireless communications system 200 may support various radio access technologies. In some implementations, the wireless communications system 200 may be or may include a 4G network, such as an LTE network or an LTE-Advanced (LTE-A) network. In some other implementations, the wireless communications system 200 may be or may include a 5G network, such as a new radio (NR) network. In other implementations, wireless communications system 200 may be a combination of a 4G network and a 5G network. Wireless communications system 200 may support radio access technologies beyond 5G. Additionally, wireless communications system 200 may support different transmission modes, such as time division multiple access (TDMA), frequency division multiple access (FDMA), or code division multiple access (CDMA), etc.

One or more base nodes 202 may be dispersed throughout a geographic region to form the backbone infrastructure of wireless communications system 200. One or more of base nodes 202a-202b (collectively "202") described herein may be, may include, or may be referred to as a base transceiver station, an access point, a NodeB, an evolution NodeB (eNB), a next-generation NodeB (gNB), or other suitable terminology. Base nodes 202 and UEs 204 may communicate via communication links 208, which may be a wireless or wired connection. In an example, base node 202 and UE 204 may wirelessly communication over a user unit (Uu) interface.

Base node 202 may provide geographic coverage area 210 for which base node 202 may support services (e.g., voice, video, packet data, messaging, broadcast, etc.) for one or more UEs 204 within geographic coverage area 210. For example, base node 202 and UE 204 may support wireless communication of signals related to services (e.g., voice, video, packet data, messaging, broadcast, etc.) according to one or multiple radio access technologies. In some implementations, base node 202 may be moveable. For example, base node 202 may be a satellite associated with a non-terrestrial network. In some implementations, different geographic coverage areas 210 associated with the same or different radio access technologies may overlap, but the different geographic coverage areas 210 may be associated with different base nodes 202. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

One or more UEs 204 may be dispersed throughout a geographic region of wireless communications system 200. UE 204 may include or may be referred to as a mobile device, a wireless device, a remote device, a handheld device, or a subscriber device, or some other suitable terminology. In some implementations, UE 204 may be referred to as a unit, a station, a terminal, or a client, among other examples. Additionally, or alternatively, the UE 204 may be referred to as an Internet-of-Things (IoT) device, an Internet-of-Everything (IoE) device, or machine-type communication (MTC) device, among other examples. In some implementations, UE 204 may be stationary in wireless communications system 200. In some other implementations, UE 204 may be mobile in wireless communications system 200.

One or more UEs 204 may be devices in different forms or having different capabilities. UE 204 may be capable of communicating with various types of devices, such as base nodes 202, other UEs 204, or network equipment (e.g., core network 206, a relay device, an integrated access and backhaul (IAB) node, or another network equipment), as shown in FIG. 2. Additionally, or alternatively, UE 204 may support communication with other base nodes 202 or UEs 204, which may act as relays in the wireless communications system 200.

UE 204 may also be able to support wireless communication directly with other UEs 204 over communication link 212. For example, UE 204 may support wireless communication directly with another UE 204 over a device-to-device (D2D) communication link. In some implementations, such as vehicle-to-vehicle (V2V) deployments, vehicle-to-everything (V2X) deployments, or cellular-V2X deployments, the communication link 212 may be referred to as a sidelink. For example, a UE 204 may support wireless communication directly with another UE 204 over a PC5 interface. UEs 204 can use transmit diversity according to aspects of the present disclosure to increase transmit power levels in a power efficient manner.

Base node 202 may support communications with core network 206, or with another base node 202, or both. For example, base node 202 may interface with core network 206 through one or more backhaul links 214 (e.g., via an S1, N2, N2, or another network interface). The base nodes 202 may communication with each other over backhaul links 214 (e.g., via X2, Xn, or another network interface). Core network 206 may support user authentication, access authorization, tracking, connectivity, and other access, routing, or mobility functions. Core network 206 may be an evolved packet core (EPC), or a 5G core (5GC).

According to aspects of the present disclosure, UE 204a supports transmit diversity and uplink MIMO with improved current drain and with a reduced chance of transmissions reaching the base node 202 out of phase and canceling each other. UE 204a applies the improvement to 1L uplink modes such as TxDiv and ULFPTx Mode 1, where RB allocation is generally low, and the UL RB/grant are below a PHR threshold. UE 204a may disable transmit chains when there is no overall benefit to uplink performance. In an example, UE 204a checks for continuous transmit power control (TPC) Up command bits from the base node 202 following disablement of a transmit chain, until at most one transmit chain is left active. UE 204a stops when disabling a transmit chain impacts the uplink signal quality experienced by the base node 202, as indicated by power-up commands. UE 204a also stop when there is only one active transmit chain left.

Deactivating the transmit chains may include partial deactivation that may enable a faster re-activation. As an alternative to fully disabling a transmit chain, the transmit chain is placed in a low power mode (sleep) or operated at a lower output power. Significant power consuming components such as RF transceiver 124a-124b, baseband modem 127a-127b, and power amplifier (PA) system 135a-135b (FIG. 1) may be particularly subject to operating at LPM or directed to a lower output power. UE 204a re-activates the inactivated transmit chains when signal quality is not satisfactory.

According to one or more aspects of the present disclosure, a device-controlled transmit (Tx) chain configuration is provided for high power modes. An entry point is a PC 1.5 device or a device with multiple Tx chains that are active. The device is in RRC-connected mode with the network and is operating in single layer mode. The present disclosure responds with actions to perform transmitter configuration: If the device is operating in Region 2 with target power less than or equal to individual transmitter power (TxPwr) capability of each chain, then the device: (i) disables lowest performing Tx chain(s); (ii) determines Tx chain performance based on one or more of: (a) pre-determined Tx chain performance based on design; and (b) real-time antenna performance as affected by channel conditions (e.g., obstructions).

Otherwise, in other aspects of the present disclosure implements a trial-and-error approach: First, the device loops through all of the Tx chains and, for a short time, temporarily (e.g., a few frames, on a frame boundary) turns off one of the other active Tx chains. The device monitors for an increased rate of transmit power control (TPC)-UP bits, which is a network power control command, over a primary period of a defined number of frames. Second, if no increased rate of UP bits is received, the device monitors (i.e., the network views the UL signal as satisfactory), the device monitors transmit power control (TPC) over an additional secondary period of a defined number of frames. Third, if there still is no increase in TPC-UP rate, then the device keeps the Tx chain OFF and the device continues to repeat these first three steps. Otherwise, if there is an increase in TPC-UP rate, then device re-activates the de-activated Tx chain. The device stops turning off any more Tx chains.

While monitoring the effect of de-activating Tx chains, the device also determines whether one or more conditions exist that prompt re-activating any de-activated Tx chains to include Tx chains in low power mode (LPM). Examples of the one or more conditions may include: (i) continuous TPC-UP bits are observed; (ii) the device is unable to decode TPC bits in downlink (DL); (iii) the device exits single layer mode and enters UL MIMO mode; (iv) the resource block (RB)/grant allocation increases; (and) a higher quality of service (QoS).

Alternatively, or in addition to using TPC-UP bits key performance indicator (KPI) to determine UL signal "goodness", the device may infer UL signal goodness based at the upper layers: (i) RLC layer: packet data unit (PDU) retransmit (ReTx) rate or acknowledgement/not acknowledged (ACK/NACK) ratio; (ii) PDCP layer: SDU/PDU discard rate; (iii) IP layer: TCP ReTx rate, Jitter, UDP packet drops, throughput degradation, latency increase. As an alternative to disabling Tx chains, the Tx chains are placed in low power mode (sleep) or operated at a lower output power. Elements of the Tx chains that are affects include the baseband modem, RF transceiver and the PA system.

Aspects of the present disclosure include a second part that addresses UL MIMO modes in device-controlled Tx chain configuration for high power modes. As an entry point, the device with multiple Tx chains that are active is in RRC-connected mode with the network. The device is operating in the UL MIMO mode with dual data layer uplink. The present disclosure provides a response with actions. The device deactivates (i.e., disables or places in LPM) lowest performing Tx chain(s) when: (i) battery level is low; (ii) no critical application is using the connection; or (iii) device is in a highly congested or faded area where there is no MIMO benefit due to radio frequency (RF) channel or backhaul conditions. RF congestion may be inferred based on monitoring for pilot pollution (i.e., strong total channel power but weak recovered energy). Backhaul congestion may be inferred based on monitoring IP packet segmentation levels relative to MTU. In one or more embodiments, the device may additionally temporarily signal to network in UE capability UL SISO support. The network responds with a downgrade from PC 1.5 to PC 2 until above conditions improve.

The device may determine the lowest performing Tx chain determination based on: (i) pre-determined antenna radiated and conducted performance based on design; (ii) real-time antenna performance as affected by RF channel conditions (e.g., presence of obstructions); and (iii) current form factor that dictates antenna correlations for a multi-form factor device (e.g., folded, expanded).

The device immediately turns on all deactivated Tx chains for recovery based on one or more of the following conditions: (i) battery level is "good" again; (ii) a critical application is using the connection; (iii) the device exits MIMO mode and enters single data layer mode; (iv) RB/grant allocation increases; or (v) a higher QoS is being used.

According to aspects of the present disclosure, in wireless communication, methods and mechanisms of a device supports transmit diversity and uplink MIMO with improved current drain and reduced chances of transmissions reaching a network node out of phase and canceling each other. In an example, the improved wireless communication applies to single data layer Uplink Layer modes such as TxDiv and ULFPTx Mode 1. In one or more embodiments, the present disclosure provides de-activating Tx chains when there is no overall benefit to uplink performance. In one or more embodiments, when a device is operating in Region 1 (i.e., target Power is greater than individual TxPwr capability of each chain), the present disclosure provides for checking for an increase in TPC-UP bit rate from the network subsequent to deactivating of a Tx chain. The device may continue de-activating Tx chains until at fewest one chain is left active. The present disclosure provides stopping the de-activation of Tx chain when deactivating of a chain impacts the uplink signal quality as evidenced by network power-up commands to the device or if there is only one chain left.

In one or more embodiments, the TPC-up bit rate measurements are performed over two stages of different frame durations. First frame duration is when monitoring immediately after turning off a Tx chain. The second frame duration is longer than the first frame duration and is used after degradation is not detected during the first frame duration. If no increase of degradation is detected over the second frame duration, then the Tx chain is kept deactivated, and the device moves to evaluate the next Tx chain.

In one or more embodiments, when the device is operating in Region 2 (i.e., target Power is less than or equal to individual TxPwr capability of each chain), the device directly deactivates the lowest performing Tx chain(s). The device determines Tx chain performance based on (1) pre-determined antenna performance based on design, (2) Real-time antenna performance as affected by obstructions; and (3) a current form factor for multiple form-factor devices.

In one or more embodiments, alternatively to deactivating Tx chains for the above described single data layer or the dual data layer scenarios, the device deactivates the Tx chains by placing the Tx chains in a low power mode (sleep) or operated at a lower output power. Included elements In one or more embodiments, the communication device reactivates any deactivated Tx chains when continuous TPC-UP bits are observed, the device is unable to decode TPC bits in DL, device exits single data uplink layer mode and enters dual layer UL MIMO mode.

In addition, the present disclosure also applies to the UL MIMO mode where the lowest performing Tx chain(s) are disabled when battery level falls below a threshold and a non-critical application is using the wireless data link. In this scenario, the changes are undone when battery level is "good" again, a critical application is using the connection, device exits MIMO mode and enters TxDiv mode, RB/grant allocation increases or higher QoS is being used.

In one or more embodiments, the present disclosure provides for optimizing battery utilization of a device by optimizing uplink single performance in both single data uplink layer and dual data layer MIMO modes. In one or more embodiments, the device responds in part based on Tx operating regions. In Region 1 (i.e., target Power greater individual TxPwr capability of each chain), the device deactivates Tx chains when there is no benefit to a user for given application and RB allocation. The lack of benefit may be determined using power control feedback from network (e.g., TPC-UP) to directly determine the impact of deactivating Tx chain. Alternatively, or in addition, the lack of benefit may be indirectly determined using upper layer indicators: (i) RLC layer: PDU ReTx rate or ACK/NACK ratio; (ii) PDCP layer: SDU/PDU discard rate; (iii) IP layer: TCP ReTx rate, Jitter, UDP packet drops, throughput degradation, latency increase. Two evaluations of TPC-up bit rates may be performed over two separate frame durations, initially after deactivating a Tx chain and then a post-evaluation over a different duration to ensure system stability. The device may evaluate deactivating a secondary Tx chain when no benefits are seen on other Tx chains In one or more embodiments, in Region 2 (i.e., target Power is less than or equal to individual TxPwr capability of each chain), the device directly deactivates the lowest performing Tx chain(s), where Tx chain performance is determined based on (1) pre-determined antenna performance based on design, (2) real-time antenna performance as affected by obstructions; and (3) current form-factor for multiple form-factor devices. The device re-activates deactivated Tx chains when continuous TPC-UP bits are observed, the device cannot decode TPC bits in DL, device exits single data layer UL mode and enters dual layer UL MIMO mode, RB/grant allocation increases, or a higher QoS is being used.

In one or more embodiments, in UL MIMO mode, the device deactivates the lowest performing Tx chain(s) when a battery level falls below a threshold and a non-critical application is using the wireless data link. The changes are undone when the battery level is "good" again, a critical application is using the connection, the device exits two data layer UL Layer MIMO mode and enters single data UL Layer mode, or a higher QoS is being used.

Figure 3:
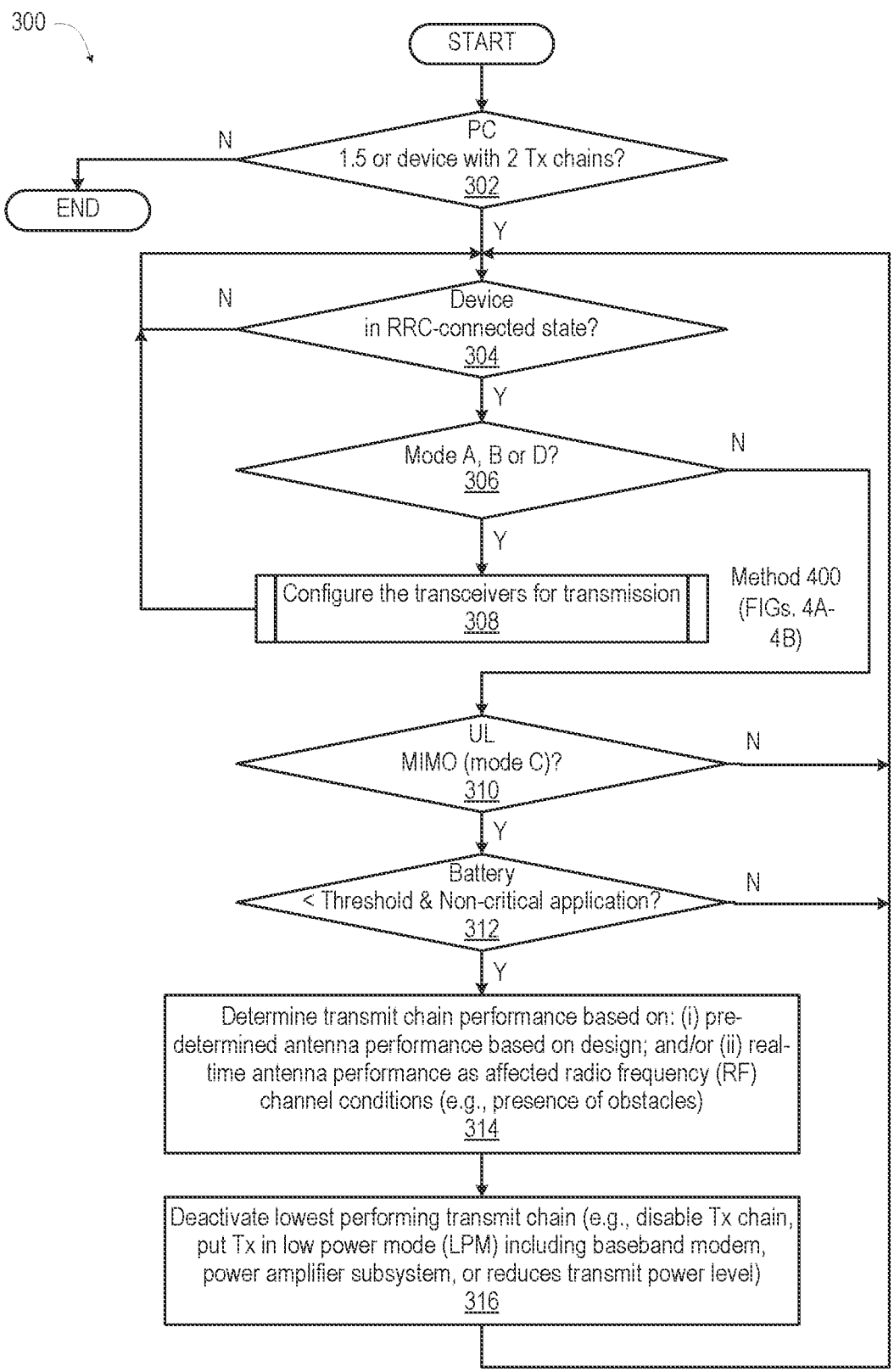
FIG. 3 is a flow diagram presenting a method performed by a communication device for efficiently managing power in one of four modes without causing unsatisfactory uplink signal quality for transmit diversity (TxDiv) or multiple input multiple output (MIMO) of two or more transmit chains, according to one or more embodiments.
Figure 4A:
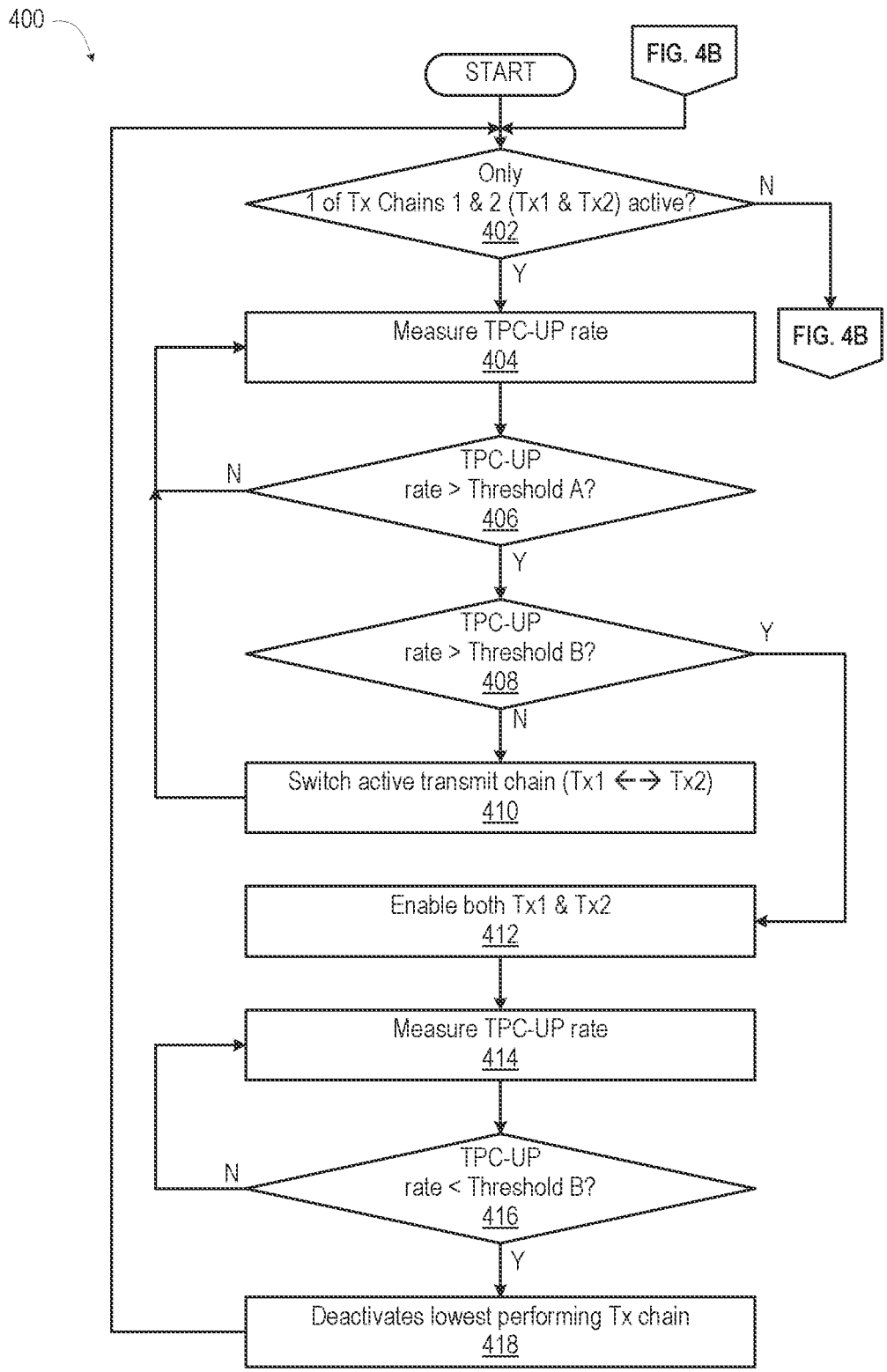
FIGS. 4A-4B (collectively "FIG. 4") are a flow diagram presenting a method that is an example implementation of configuration transmission configuration for modes three or four of the method of FIG. 3, according to one or more embodiments.
Figure 4B:
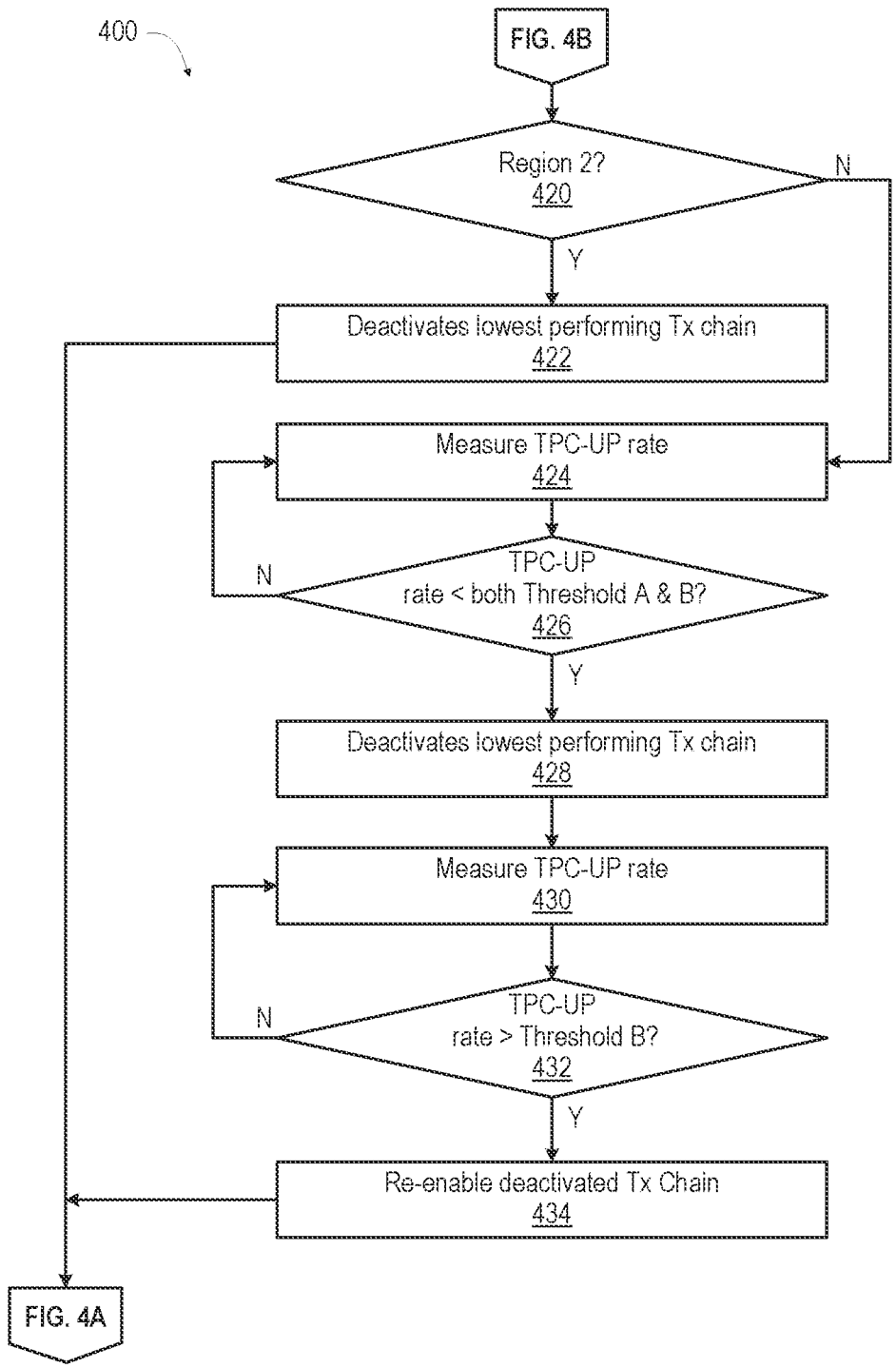

FIG. 3 is a flow diagram presenting method 300 performed by a communication device for efficiently managing power in one of four modes A, B, C, and D without causing unsatisfactory uplink signal quality for TxDiv or MIMO of two or more transmit chains. FIGS. 4A-4B (collectively "FIG. 4") are a flow diagram presenting method 400 that is an example implementation of configuration transmission configuration for modes A, B, and D of method 300 (FIG. 3). The description of method 300 (FIG. 3) and method 400 (FIGS. 4A-4B) are provided with general reference to the specific components illustrated within the preceding FIGS. 1-2. Specific components referenced in method 300 (FIG. 3) and method 400 (FIGS. 4A-4B) may be identical or similar to components of the same name used in describing preceding FIGS. 1-2. In one or more embodiments, controller 101 configures communication device 100 (FIG. 1) or UE 204a (FIG. 2) to provide the described functionality of method 300 (FIG. 3) and method 400 (FIGS. 4A-4B).

With reference to FIG. 3, method 300 includes determining whether the communication device is configured for power class 1.5 or for two or more transmit (Tx) chains (decision block 302). In response to determining that the communication device is not configured for power class 1.5 nor for two or more Tx chains, method 300 includes determining whether the communication device is in Radio Resource Control (RRC) connected state (decision block 304).

Besides being deactivated, the communication device can be in two (2) or three (3) states with regard to communication with a network node of a radio access network (RAN). In legacy radio access technologies such as LTE, these states with regard to RRC are idle and connected. In the connected state, radio resources are allocated to the user equipment (UE) such as a communication device and typically active communication (i.e., user plane or control plane) is taking place between the UE and the network. Otherwise, UE is in idle state. While releasing an RRC connection is good for capacity utilization and power saving, the idle state not ideal from a latency perspective. Reestablishing a connection takes a substantial period of time. Machine type communications (MTC) and Internet of Things (IoT) applications typically send small amounts of data. The overhead required to establish an RRC connection exceeds maintaining a connection with minimal signaling until the small amount of data is ready for transmission. The extra signaling also introduces delay that is not ideal for 5G ultra reliable low latency communication (URLLC). In inactive mode that was introduced for such application, both the UE and RAN save radio and security configurations ("UE Inactive Access Stratum (AS) context"), which can be quickly restored with minimal signaling when moving to connected state. Essentially, RRC inactive state implements an "always on" radio connection with the RAN.

In response to determining whether the communication device is not in RRC connected state in decision block 304, method 300 returns to block 304. In response to determining whether the communication device is in RRC connected state, method 300 includes determining whether the communication device is in one of modes A, B or D (decision block 306). Specifically, Mode B refers to single layer MIMO using uplink full power transmission (ULFPTx) Mode 1, maximum rank of 1. Mode C refers to UL MIMO with two uplink layers with maximum rank "2". Mode D refers to single layer and maximum rank 2. In response to determining that the communication device is in one of modes A, B, or D, method 300 includes configuring the transceivers for transmission (block 308). Then method 300 returns to block 304. An example of implementing block 308 is provided by method 400 (FIGS. 4A-4B). In one or more embodiments, changes in communication status may trigger repetitions of method 300. In addition, the implementation method 400 (FIGS. 4A-4B) includes a repeated process.

In response to determining that the communication device is not in one of modes A, B, or D, method 300 includes determining whether the communication device is in uplink (UL) MIMO mode (i.e., mode C) (decision block 310). In response to determining that the communication device is not in mode C, method 300 returns to block 304. In response to determining that the communication device is in mode C, method 300 includes determining whether both: (i) a charge level of a battery of the communication device is below a threshold; and (ii) a non-critical application is using the mode C UL transmission (decision block 312). In response to determining that either the charge level is not below (i.e., greater than or equal to) the threshold or critical application is using the uplink (i.e., the determination of decision block 312 is NO), method 300 returns to block 304. In response to determining that both the charge level is below the threshold and a non-critical application is using the uplink (i.e., the determination of decision block 312 is YES), method 300 includes determining transmit chain performance based on: (i) pre-determined antenna performance based on design; and/or (ii) real-time antenna performance as affected radio frequency (RF) channel conditions (e.g., presence of obstacles) (block 314). Method 300 includes deactivating lowest performing transmit chain (e.g., disable Tx chain, put Tx in low power mode (LPM) including baseband modem, power amplifier subsystem, or reduces transmit power level) (block 316). Then method 300 returns to block 304.

With reference to FIG. 4A, method 400 includes determining whether only one transmit (Tx) chain of two Tx chains (Tx1 and Tx2) is active (decision block 402). In response to determining NO to whether only one Tx chain is active (i.e., both Tx1 and Tx2 are active), method 400 proceeds to block 420 of FIG. 4B. Based on previous determinations and for clarity, the communication device is presumed to have at least one active Tx chain so the determination of decision block 402 is for one or two active Tx chains. In response to determining that only one Tx chain is active in decision block 402, method includes measuring total power control "UP" command (TPC-UP) rate (block 404). Method 400 includes determining whether TPC-UP rate is greater than a threshold "A" (decision block 406). In response to determining that TPC-UP rate is not greater than (i.e., less than or equal to) the threshold "A", method 400 returns to block 404. In response to determining that TPC-UP rate is greater than the threshold "A", method 400 includes determining whether the TPC-UP rate is greater than a threshold "B" (decision block 408). Threshold B is greater than threshold A. In response to determining that the TPC-UP rate is not greater than (i.e., less than or equal to) the threshold "B", method 400 includes switching the active transmit chain between first and second Tx chains (Tx1 and Tx2) (block 410). Then method 400 returns to block 404. In response to determining that the TPC-UP is greater than the threshold "B" in decision block 408, method 400 includes enabling both first and second transmit chains (Tx1 and Tx2) (block 412). Method 400 includes measuring TPC-UP rate (block 414). Method 400 includes determining whether the TPC-UP rate is not less than threshold B (decision block 416). In response to determining whether the TPC-UP rate is not less than (i.e., greater than or equal to) threshold B, method 400 returns to block 414. In response to determining whether the TPC-UP rate is less than threshold B, method 400 includes deactivating a lowest performing Tx chain (block 418). Then method 400 returns to block 402.

With reference to FIG. 4B, in response to determining NO to decision block 402 (FIG. 4A), method 400 includes determining whether the communication device is in Region 2 (i.e., target power is less than or equal to individual transmitter power (TxPwr) capability of each Tx chain) (decision block 420). In response to determining that the communication device is in Region 2, method 400 includes deactivating a lowest performing transmit chain (block 422). Then method 400 returns to block 402 (FIG. 4A). In response to determining that the communication device is not in Region 2 (i.e., target power is greater than the individual transmitter power (TxPwr) capability of each Tx chain and is thus in Region 1 in decision block 420), method 400 includes measuring TPC-UP rate (block 424). Method 400 includes determining whether the TPC-UP rate is less than both thresholds A and B (decision block 426). In respond to determining whether the TPC-UP rate is not less than (i.e., greater than) thresholds A and B, method 400 returns to block 424. In respond to determining whether the TPC-UP rate is less than thresholds A and B, method 400 includes deactivating a lowest performing Tx chain (block 428). Method 400 includes measuring TPC-UP rate (block 430). Method 400 includes determining whether the TPC-UP rate is greater than the threshold B (decision block 432). In response to determining that the TPC-UP rate is not greater than (i.e., less than or equal to) the threshold B, method 400 returns to block 430. In response to determining that the TPC-UP rate is greater than the threshold B, method 400 includes re-enabling deactivated transmit chains (block 434). Then method 400 returns to block 402 (FIG. 4A).

Figure 5:
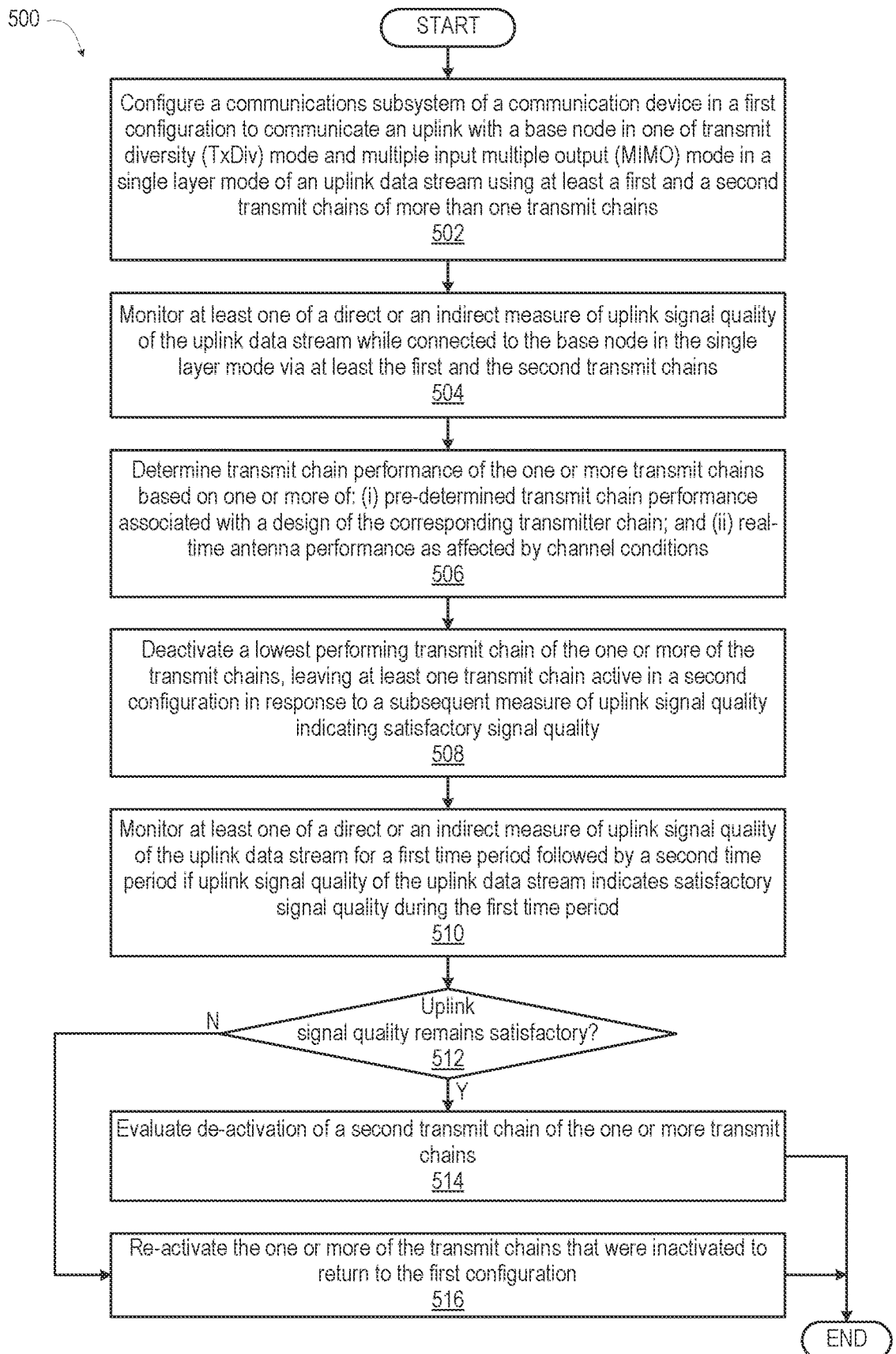
FIG. 5 is a flow diagram presenting a high-level method performed by a communication device for efficiently managing power without causing unsatisfactory uplink signal quality for TxDiv or MIMO of two or more transmit chains, according to one or more embodiments.

FIG. 5 is a flow diagram presenting a high-level method 500 performed by a communication device for efficiently managing power without causing unsatisfactory uplink signal quality for TxDiv or MIMO of two or more transmit chains. FIGS. 6A-6D (collectively "FIG. 6") are a flow diagram presenting method 600 that is an example implementation of method 500 (FIG. 5). The description of method 500 (FIG. 5) and method 600 (FIGS. 6A-6D) are provided with general reference to the specific components illustrated within the preceding FIGS. 1-2. Specific components referenced in method 500 may be identical or similar to components of the same name used in describing preceding FIGS. 1-2. In one or more embodiments, controller 101 configures communication device 100 (FIG. 1) or UE 204a (FIG. 2) to provide the described functionality of method 500 (FIG. 5) and method 600 (FIGS. 6A-6D).

With reference to FIG. 5, method 500 includes configuring a communications subsystem of a communication device in a first configuration to communicate an uplink with a base node in one of transmit diversity (TxDiv) mode and multiple input multiple output (MIMO) mode in a single layer mode of an uplink data stream using at least a first and a second transmit chains of more than one transmit chains (block 502). Method 500 includes monitoring at least one of a direct or an indirect measure of uplink signal quality of the uplink data stream while connected to the base node in the single layer mode via at least the first and the second transmit chains (block 504). Method 500 includes determining transmit chain performance of the one or more transmit chains based on one or more of: (i) pre-determined transmit chain performance associated with a design of the corresponding transmitter chain; and (ii) real-time antenna performance as affected by channel conditions (block 506). Method 500 includes deactivating a lowest performing transmit chain of the one or more of the transmit chains, leaving at least one transmit chain active in a second configuration in response to a subsequent measure of uplink signal quality indicating satisfactory signal quality (block 508). Method 500 includes monitoring at least one of a direct or an indirect measure of uplink signal quality of the uplink data stream for a first time period followed by a second time period if uplink signal quality of the uplink data stream indicates satisfactory signal quality during the first time period (block 510). Method includes determining whether the uplink signal quality indicates satisfactory during both of the first or the second time period (decision block 512). In response to determining that signal quality remained satisfactory, method 500 includes evaluating de-activation of a second transmit chain of the one or more transmit chains (block 514). Then method 500 ends. In response to determining that signal quality did not remain satisfactory, method 500 includes re-activating the one or more of the transmit chains that were inactivated to return to the first configuration subsequent to deactivating the one or more transmit chains and in response to the measure of uplink signal quality indicating unsatisfactory signal quality during either of the first and the second time periods after deactivating the one or more transmit chains (block 516). Then method 500 ends.

In one or more embodiments, method 500 includes monitoring the direct measure of the uplink signal quality based on transmit power control commands received from the base node. Method 500 includes determining that the direct measure indicates unsatisfactory signal quality based on receiving one or more up commands for transmit power control.

In one or more embodiments, method 500 includes monitoring the indirect measure of the uplink signal quality by tracking one or more among: (i) radio link control (RLC) packet data unit (PDU) retransmit or drop rate; (ii) ratio of acknowledged messages to not acknowledged messages received from the base node; (iii) packet data convergence protocol (PDCP) layer service data unit (SDU)/PDU discard rate; (iv) Internet protocol (IP) layer transport control protocol (TCP) retransmit rate; (v) user datagram protocol (UDP) packet drops; (vi) throughput degradation; (vi) and increase in data latency.

In one or more embodiments, method 500 includes re-activating the one or more of the transmit chains that were previously inactivated to return to the first configuration being in response to identifying one or more among: (i) an inability to decode transmit power control commands in a downlink received from the base node; (ii) transitioning from one layer mode to a two layer uplink MIMO mode; (iii) an increase in resource block grant allocation; and (iv) a change to a higher quality of service (QoS).

In one or more embodiments, method 500 includes deactivating the one or more of the transmit chains comprises performing one among: (i) turning off at least one transmit chain; (ii) configuring at least one transmit chain to operate in a low power mode; and (iii) reducing a transmit power level of at least one transmit chain.

In one or more embodiments, method 500 includes determining whether the communication device is: (i) in a first transmit power region that requires a total transmit power for the uplink being greater than a transmit power capability of each of the one or more transmit chains; or (ii) in a second transmit power region that requires the total transmit power for the uplink being equal to or less than the transmit power capability of at least one of the transmit chains. Method 500 includes deactivating one or more of the transmit chains with at least one transmit chain remaining active in response to either: (i) the measure of uplink signal quality indicating unsatisfactory signal quality; or (ii) determining that the communication device being in a second transmit power region. In one or more particular embodiments, method 500 includes determining the total transmit power required being in response to one among: (i) an active resource block allocation; and (ii) a future slot allocation based on a grant received from the base node.

In one or more embodiments, method 500 includes configuring the communications subsystem in a third configuration to communicate the uplink with the base node in more than one layer in performing MIMO mode using at least the first and the second transmit chain. Method 500 includes deactivating one or more of the transmit chains with at least one transmit chain remaining active in a fourth configuration in response to one or more conditions from among: (i) a battery charge level being less than a battery charge level threshold; (ii) a noncritical application using the uplink. In one or more particular embodiments, subsequent to deactivating the one or more of the transmit chains in the fourth configuration while communicating in more than one layer in MIMO mode, method 500 includes activating the one or more of the transmit chains that were inactivated to return to the third configuration in response to identifying at least one changed condition among: (i) the communications subsystem being reconfigured to communicate the uplink in the single layer mode and in the MIMO mode; (ii) a quality of service (QoS) for the uplink being increased to a higher level; (iii) the battery charge level being equal to or greater than the battery charge level threshold; and (iv) one or more critical applications require re-activation of the one or more of the transmit chains.

Figure 6A:
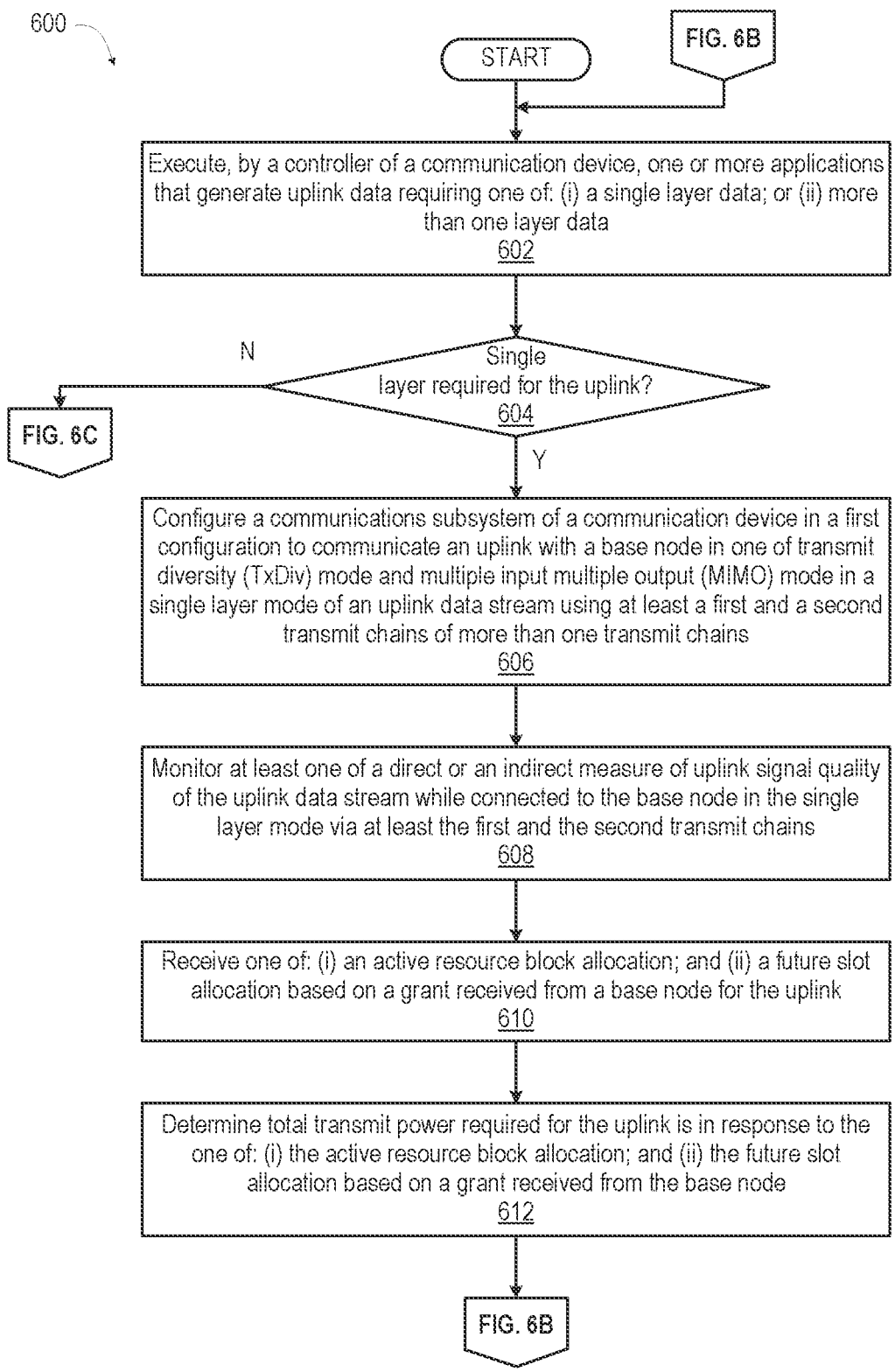
FIGS. 6A-6D (collectively "FIG. 6") are a flow diagram presenting a method that is an example implementation of the high-level method of FIG. 5, according to one or more embodiments.

With reference to FIG. 6A, Method 600 includes executing, by a controller of a communication device, one or more applications that generate uplink data requiring one of single layer data or more than one layer data (block 602). For conciseness and clarity, the case of having no need to transmit an uplink is omitted. Method 600 includes determining whether only a single layer is required for the uplink (decision block 604). In response to determining that more than one layer is required, method 600 proceeds to block 636 (FIG. 6D).

In response to determining that a single layer is required, method 600 includes configuring a communications subsystem of the communication device in a first configuration to communicate an uplink with a base node in one of transmit diversity (TxDiv) mode and multiple input multiple output (MIMO) mode in a single layer mode of an uplink data stream using at least a first and a second transmit chains of more than one transmit chains (block 606). Method 600 includes monitoring at least one of a direct or an indirect measure of uplink signal quality of the uplink data stream, while the communication device is connected to the base node in the single layer mode via at least the first and the second transmit chains (block 608). In an example, method 600 includes monitoring the direct measure of the uplink signal quality based on transmit power control commands received from the base node and determining that the direct measure indicates unsatisfactory signal quality based on receiving one or more up commands for transmit power control. In one or more embodiments, continuous up commands indicate unsatisfactory signal quality. In another example, method 600 includes monitoring the indirect measure of the uplink signal quality by tracking one or more among: (i) radio link control (RLC) packet data unit (PDU) retransmit or drop rate; (ii) ratio of acknowledged messages to not acknowledged messages received from the base node; (iii) packet data convergence protocol (PDCP) layer service data unit (SDU)/PDU discard rate; (iv) Internet protocol (IP) layer transport control protocol (TCP) retransmit rate; (v) user datagram protocol (UDP) packet drops; (vi) throughput degradation; and (vii) increase in data latency.

In one or more embodiments, method 600 includes receiving one among: (i) an active resource block allocation; and (ii) a future slot allocation based on a grant received from a base node for the uplink (block 610). Method 600 includes determining total transmit power required for the uplink in response to the one among: (i) the active resource block allocation; and (ii) the future slot allocation based on a grant received from the base node (block 612). Then method 600 proceeds to block 614 (FIG. 6B).

Figure 6B:
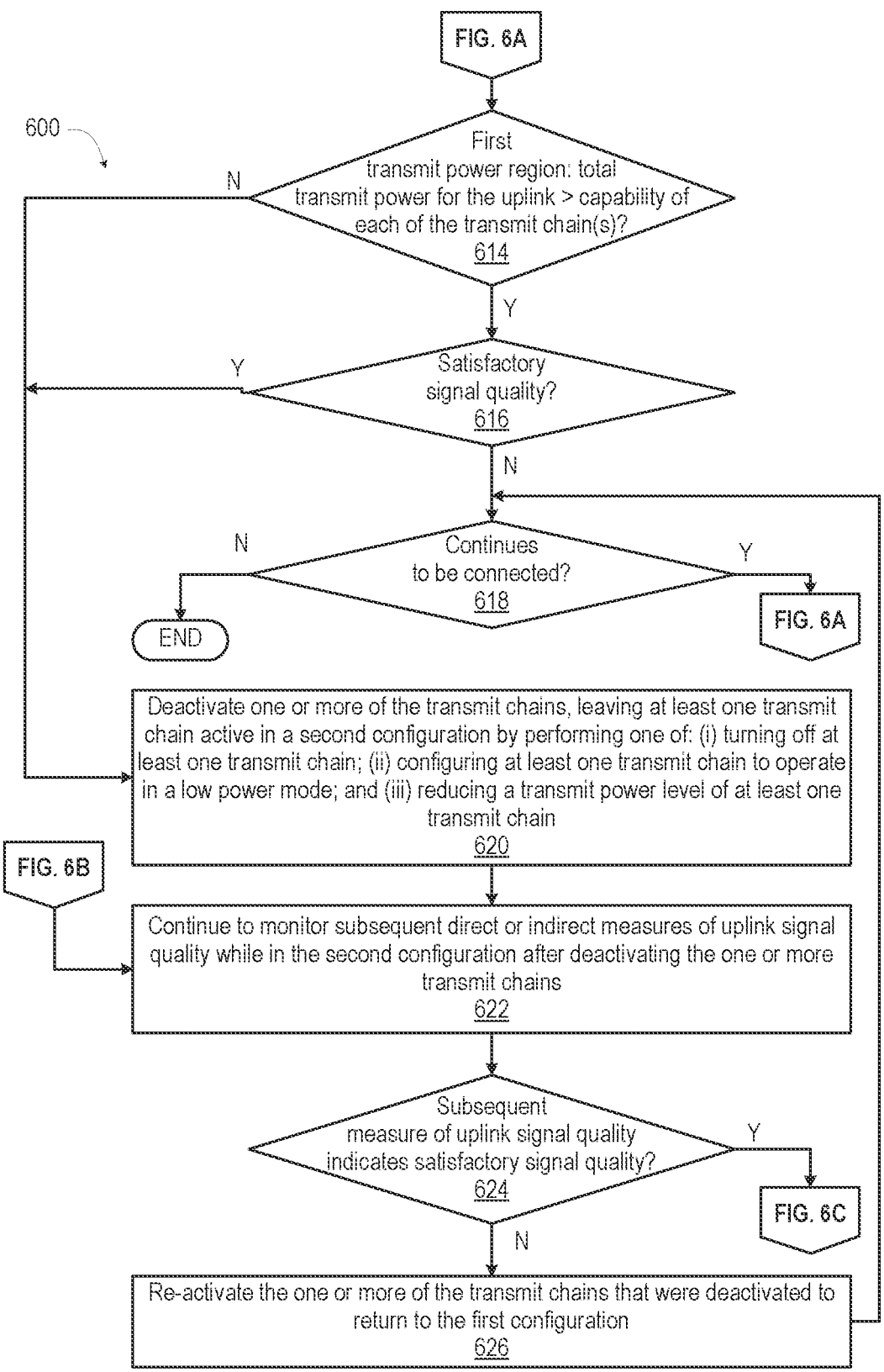

With reference to FIG. 6B, method 600 includes determining whether the communication device is in a first transmit power region that requires a total transmit power for the uplink that is greater than a transmit power capability of each of the one or more transmit chains (decision block 614). The alternative to the first transmit power region is a second transmit power region that requires the total transmit power for the uplink that is equal to or less than the transmit power capability of at least one of the transmit chains. In response to determining that the communication device is in the first transmit power region, method 600 includes determining whether signal quality is satisfactory (decision block 616). In response to determining that signal quality is unsatisfactory, method 600 includes determining whether the communication device continues to be connected to the base node (decision block 618). In response to determining that the communication device continues to be connected to the base node, method 600 returns to block 602 (FIG. 6A). In response to determining that the communication device does not continue to be connected to the base node, method 600 ends. In response to determining that the communication device is in the second region in decision block 614 or in response to determining that the signal quality is satisfactory in decision block 616, method 600 includes deactivating one or more of the transmit chains, leaving at least one transmit chain active in a second configuration by performing one of: (i) turning off at least one transmit chain; (ii) configuring at least one transmit chain to operate in a low power mode; and (iii) reducing a transmit power level of at least one transmit chain (block 620). Turning off a transmit chain may include removing power to one or more radio frequency (RF) and baseband components. Operating in a low power mode may include keeping portions of the communications subsystem, such as a baseband processor, powered to reduce time required to reactivate, while turning off high power drain components such as the RF frontend. Method 600 includes continuing to monitor subsequent direct or indirect measures of uplink signal quality while in the second configuration after deactivating the one or more transmit chains (block 622). Method 600 includes determining whether a subsequent measure of uplink signal quality indicates satisfactory signal quality (decision block 624). In response to determining that the uplink signal quality indicates unsatisfactory signal quality, method 600 includes re-activating the one or more of the transmit chains that were deactivated to return to the first configuration (block 626). Then method 600 returns to block 618. In response to determining that the uplink signal quality indicates satisfactory signal quality, method 600 proceeds to block 628 (FIG. 6C).

Figure 6C:
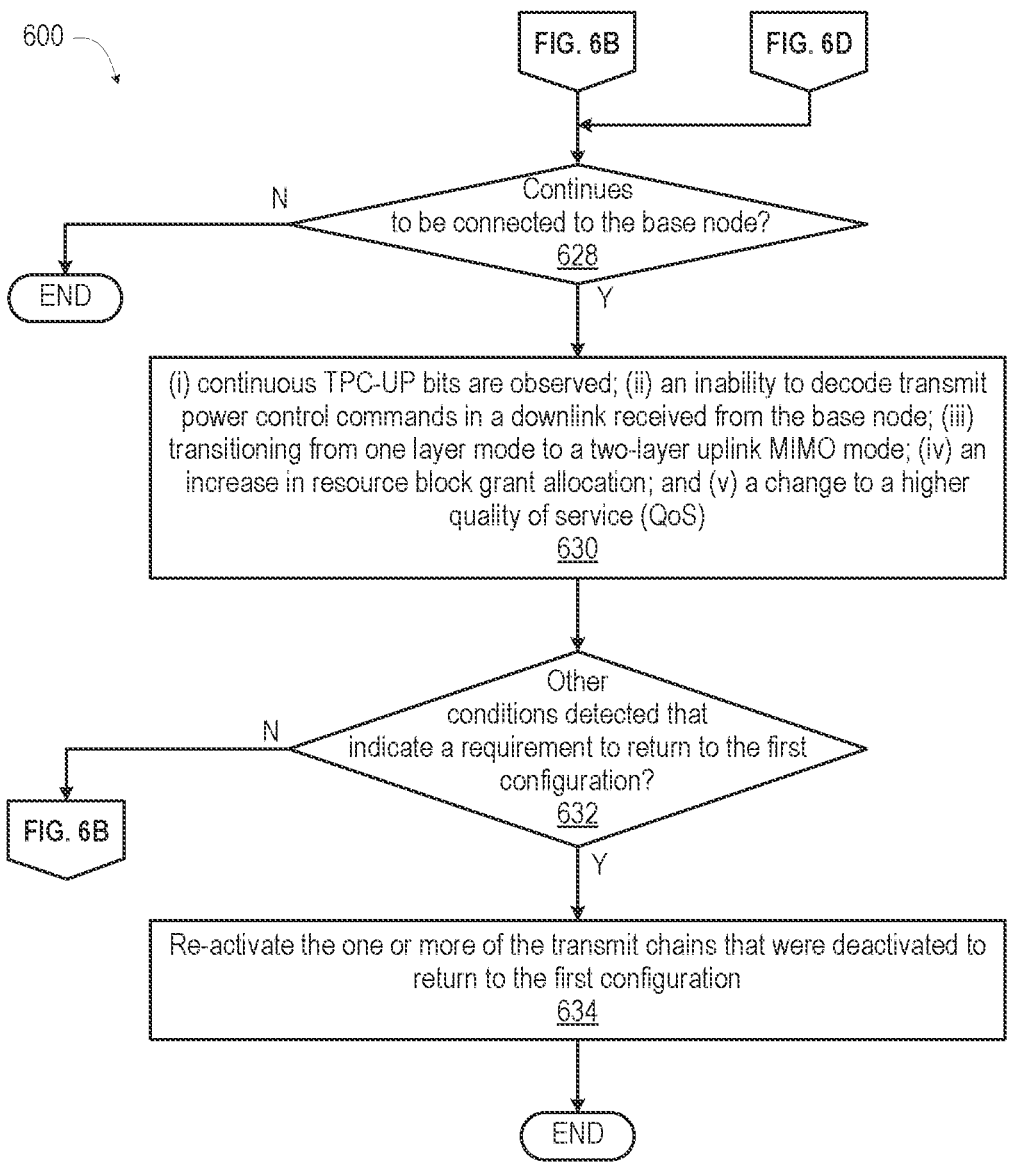
Figure 6D:
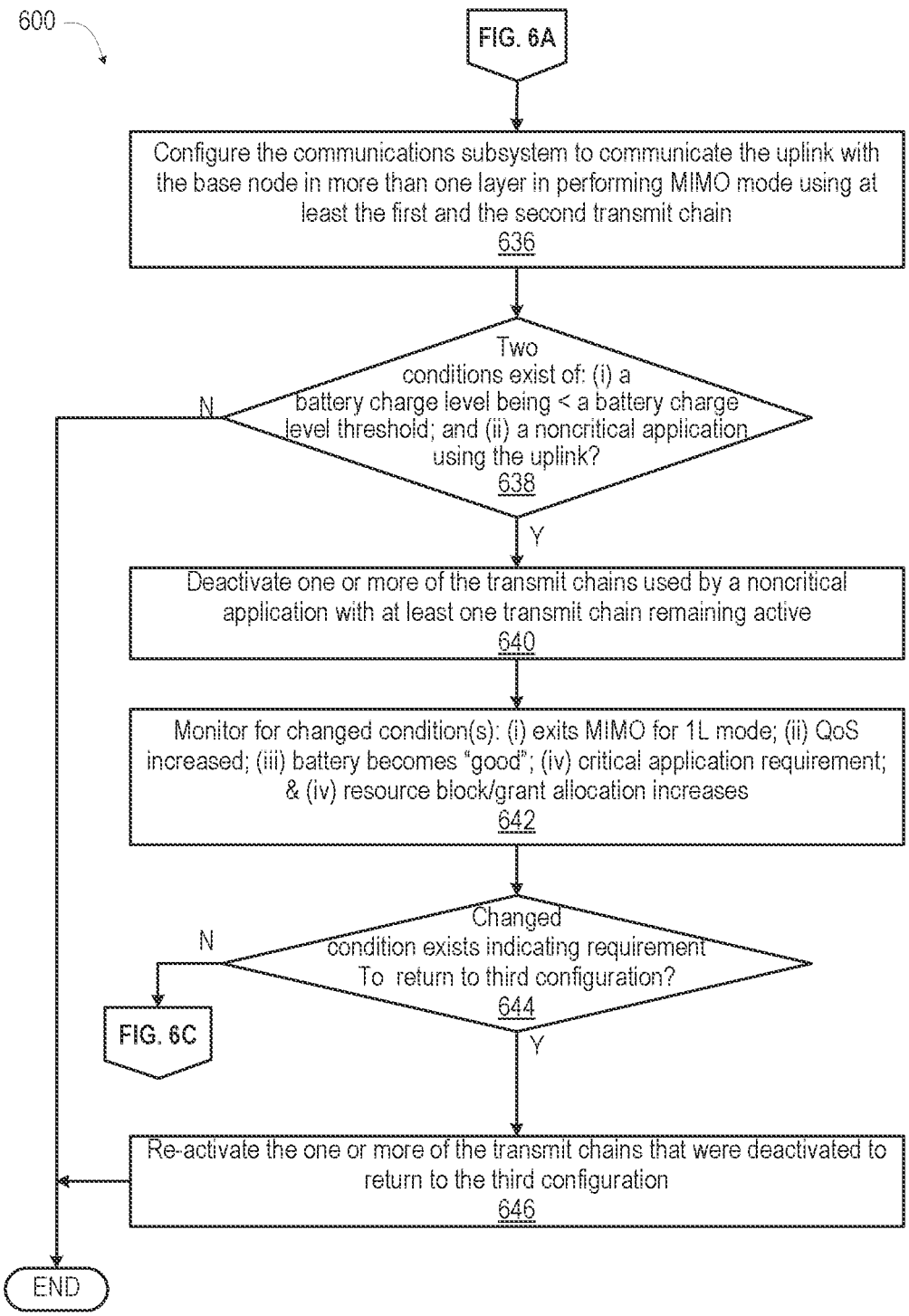

With reference to FIG. 6C, method 600 includes determining whether the communication device continues to be connected to the base node (decision block 628). In response to determining that the communication device does not continue to be connected to the base node, method 600 ends. In response to determining that the communication device continues to be connected to the base node, method 600 includes monitoring for other conditions that include but are not necessarily limited to including: (i) continuous TPC-UP bits are observed; (ii) an inability to decode transmit power control commands in a downlink received from the base node; (iii) transitioning from one layer mode to a two-layer uplink MIMO mode; (iv) an increase in resource block grant allocation; and (v) a change to a higher quality of service (QoS) (block 630). Method 600 includes determining whether one or more of the other conditions are detected that indicate a requirement to return to the first configuration (decision block 632). In response to determining in decision block 632 that other conditions are detected that indicate a requirement to return to the first configuration, method 600 includes re-activating the one or more of the transmit chains that were inactivated to return to the first configuration (block 634). Then method 600 ends. Returning to decision block 632, in response to determining in decision block 632 that no other conditions are detected that indicate a requirement to return to the first configuration, method 600 returns to block 622 (FIG. 6B).

With reference to FIG. 6D, in response to determining that a single layer for the uplink is not required (i.e., more than one layer is required) in decision block 604 (FIG. 6A), method 600 includes configuring the communications subsystem to communicate the uplink with the base node in more than one layer in performing MIMO mode, using at least the first and the second transmit chain (block 636). Method 600 includes determining whether the following two conditions exist: (i) a battery charge level being less than a battery charge level threshold; and (ii) a noncritical application is using the uplink (decision block 638). In response to the two conditions not existing, method 600 ends. In response to the two conditions existing, method 600 includes deactivating one or more of the transmit chains used by a noncritical application, with at least one transmit chain remaining active (block 640). Method 600 includes monitoring for changed condition(s): (i) the communications subsystem is reconfigured to communicate the uplink in the single layer mode and in the MIMO mode; (ii) a quality of service (QoS) for the uplink is increased to a higher level; (iii) the battery charge level being equal to or greater than the battery charge level threshold; (iv) one or more critical applications require re-activation of the one or more of the transmit chains; and (v) resource block/grant allocation increases (block 642). Method 600 includes determining whether the changed condition exists indicating that a requirement exists for returning to the third configuration (decision block 644). In response to determining that the changed condition does not exist, method 600 returns to block 628 (FIG. 6C). In response to determining that the changed condition exists, method 600 includes re-activating the one or more of the transmit chains that were deactivated to return to the third configuration (block 646). Then method 600 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
a communications subsystem having more than one transmit chains comprising at least a first transmit chain and a second transmit chain configurable to perform one of transmit diversity (TxDiv) mode and multiple input multiple output (MIMO) mode; and
a controller communicatively coupled to the communications subsystem, and which:
configures the communications subsystem in a first configuration to communicate an uplink with a base node in a single layer mode of an uplink data stream using at least the first and the second transmit chains;
monitors at least one of a direct or an indirect measure of uplink signal quality of the uplink data stream while connected to the base node in the single layer mode via at least the first and the second transmit chains;
determines whether the communication device is in a second transmit power region that requires the total transmit power for the uplink being equal to or less than the transmit power capability of at least one of the transmit chains;
deactivates one or more of the transmit chains, leaving at least one transmit chain active in a second configuration, in response to either: (i) a measure of uplink signal quality indicating unsatisfactory signal quality; or (ii) determining that the communication device is in the second transmit power region that requires the total transmit power for the uplink being equal to or less than the transmit power capability of at least one of the transmit chains; and
in response to the measure of uplink signal quality indicating unsatisfactory signal quality after deactivating the one or more transmit chains, re-activates the one or more of the transmit chains that were inactivated to return to the first configuration.

2. The communication device of claim 1, wherein the controller:
determines transmit chain performance of the one or more transmit chains based on one or more of: (i) predetermined transmit chain performance associated with a design of a corresponding transmitter chain; and (ii) real-time antenna performance as affected by channel conditions; and
deactivates a lowest performing transmit chain of the one or more transmit chains.

3. The communication device of claim 1, wherein the controller:
monitors at least one of a direct or an indirect measure of uplink signal quality of the uplink data stream for a first time period;
monitors at least one of a direct or an indirect measure of uplink signal quality of the uplink data stream for a second time period in response to uplink signal quality indicating unsatisfactory signal quality during the first time period;
re-activates the one or more of the transmit chains that were inactivated to return to the first configuration in response to uplink signal quality indicating unsatisfactory signal quality during either of the first and the second time periods; and
evaluates de-activation of a second transmit chain of the one or more transmit chains in response to uplink signal quality indicating unsatisfactory signal quality during both of the first and the second time periods.

4. The communication device of claim 1, wherein the controller:
monitors the direct measure of the uplink signal quality based on transmit power control commands received from the base node; and
determines that the direct measure indicates unsatisfactory signal quality based on receiving one or more up commands for transmit power control.

5. The communication device of claim 1, wherein the controller:
monitors the indirect measure of the uplink signal quality by tracking one or more among: (i) radio link control (RLC) packet data unit (PDU) retransmit or drop rate; (ii) ratio of acknowledged messages to not acknowledged messages received from the base node; (iii) packet data convergence protocol (PDCP) layer service data unit (SDU)/PDU discard rate; (iv) Internet protocol (IP) layer transport control protocol (TCP) retransmit rate; (v) user datagram protocol (UDP) packet drops; (vi) throughput degradation; (vi) and increase in data latency.

6. The communication device of claim 1, wherein the controller re-activates the one or more of the transmit chains that were previously inactivated to return to the first configuration in response to identifying one or more among: (i) an inability to decode transmit power control commands in a downlink received from the base node; (ii) transitioning from one layer mode to a two layer uplink MIMO mode; (iii) an increase in resource block grant allocation; and (iv) a change to a higher quality of service (QoS).

7. The communication device of claim 1, wherein the controller deactivates the one or more of the transmit chains by performing one among: (i) turning off at least one transmit chain; (ii) configuring at least one transmit chain to operate in a low power mode; and (iii) reducing a transmit power level of at least one transmit chain.

8. The communication device of claim 1, wherein the controller:
determines whether the communication device is: (i) in a first transmit power region that requires a total transmit power for the uplink being greater than a transmit power capability of each of the one or more transmit chains; or (ii) in the second transmit power region.

9. The communication device of claim 8, wherein the controller determines total transmit power required in response to one among: (i) an active resource block allocation; and (ii) a future slot allocation based on a grant received from the base node.

10. The communication device of claim 1, wherein the controller:
configures the communications subsystem to communicate the uplink with the base node in more than one layer in performing MIMO mode using at least the first and the second transmit chain in a third configuration; and
deactivates one or more of the transmit chains with at least one transmit chain remaining active in a fourth configuration in response to one or more conditions from among: (i) a battery charge level being less than a battery charge level threshold; (ii) a noncritical application using the uplink.

11. The communication device of claim 10, wherein the controller:

subsequent to deactivating the one or more of the transmit chains while communicating in more than one layer in MIMO mode in the fourth configuration:
activates the one or more of the transmit chains to return to the third configuration that were inactivated in the fourth configuration in response to identifying at least one changed condition among: (i) the communications subsystem being reconfigured to communicate the uplink in the single layer mode and in the MIMO mode; (ii) a quality of service (QoS) for the uplink being increased to a higher level; (iii) the battery charge level being equal to or greater than the battery charge level threshold; and (iv) one or more critical applications requiring re-activation of the one or more of the transmit chains.

12. A method comprising:
configuring a communications subsystem of a communication device in a first configuration to communicate an uplink with a base node in one of transmit diversity (TxDiv) mode and multiple input multiple output (MIMO) mode in a single layer mode of an uplink data stream using at least a first and a second transmit chains of more than one transmit chains;
monitoring at least one of a direct or an indirect measure of uplink signal quality of the uplink data stream while connected to the base node in the single layer mode via at least the first and the second transmit chains;
determining whether the communication device is in a second transmit power region that requires the total transmit power for the uplink being equal to or less than the transmit power capability of at least one of the transmit chains;
deactivating one or more of the transmit chains, leaving at least one transmit chain active in a second configuration, in response to either: (i) a measure of uplink signal quality indicating unsatisfactory signal quality; or (ii) determining that the communication device is in the second transmit power region that requires the total transmit power for the uplink being equal to or less than the transmit power capability of at least one of the transmit chains; and
subsequent to deactivating the one or more transmit chains and in response to the measure of uplink signal quality indicating unsatisfactory signal quality after deactivating the one or more transmit chains, re-activating the one or more of the transmit chains that were inactivated to return to the first configuration.

13. The method of claim 12, further comprising:
determining transmit chain performance of the one or more transmit chains based on one or more of: (i) pre-determined transmit chain performance associated with a design of a corresponding transmitter chain; and (ii) real-time antenna performance as affected by channel conditions;
deactivating the one or more of the transmit chains by selecting a lowest performing transmit chain of the one or more transmit chains;
monitoring at least one of a direct or an indirect measure of uplink signal quality of the uplink data stream for a first time period;
monitoring at least one of a direct or an indirect measure of uplink signal quality of the uplink data stream for a second time period in response to uplink signal quality indicating unsatisfactory signal quality during the first time period;
re-activating the one or more of the transmit chains that were inactivated to return to the first configuration in response to uplink signal quality indicating unsatisfactory signal quality during either of the first and the second time periods; and
evaluating de-activation of a second transmit chain of the one or more transmit chains in response to uplink signal quality indicating unsatisfactory signal quality during both of the first and the second time periods.

14. The method of claim 12, further comprising:
monitoring the direct measure of the uplink signal quality based on transmit power control commands received from the base node; and
determining that the direct measure indicates unsatisfactory signal quality based on receiving one or more up commands for transmit power control.

15. The method of claim 12, further comprising monitoring the indirect measure of the uplink signal quality by tracking one or more among: (i) radio link control (RLC) packet data unit (PDU) retransmit or drop rate; (ii) ratio of acknowledged messages to not acknowledged messages received from the base node; (iii) packet data convergence protocol (PDCP) layer service data unit (SDU)/PDU discard rate; (iv) Internet protocol (IP) layer transport control protocol (TCP) retransmit rate; (v) user datagram protocol (UDP) packet drops; (vi) throughput degradation; (vi) and increase in data latency.

16. The method of claim 12, wherein re-activating the one or more of the transmit chains that were previously inactivated to return to the first configuration being in response to identifying one or more among: (i) an inability to decode transmit power control commands in a downlink received from the base node; (ii) transitioning from one layer mode to a two layer uplink MIMO mode; (iii) an increase in resource block grant allocation; and (iv) a change to a higher quality of service (QoS).

17. The method of claim 12, wherein deactivating the one or more of the transmit chains comprises performing one among: (i) turning off at least one transmit chain; (ii) configuring at least one transmit chain to operate in a low power mode; and (iii) reducing a transmit power level of at least one transmit chain.

18. The method of claim 12, further comprising:
determining whether the communication device is: (i) in a first transmit power region that requires a total transmit power for the uplink being greater than a transmit power capability of each of the one or more transmit chains; or (ii) in the second transmit power region.

19. The method of claim 12, further comprising:
configuring the communications subsystem in a third configuration to communicate the uplink with the base node in more than one layer in performing MIMO mode using at least the first and the second transmit chain;
deactivating one or more of the transmit chains with at least one transmit chain remaining active in a fourth configuration in response to one or more conditions from among: (i) a battery charge level being less than a battery charge level threshold; (ii) a noncritical application using the uplink;
subsequent to deactivating the one or more of the transmit chains in the fourth configuration while communicating in more than one layer in MIMO mode:
activating the one or more of the transmit chains that were inactivated to return to the third configuration in response to identifying at least one changed condition among: (i) the communications subsystem being reconfigured to communicate the uplink in the single layer mode and in the MIMO mode; (ii) a quality of service (QoS) for the uplink being increased to a higher level; (iii) the battery charge level being equal to or greater than the battery charge level threshold; and (iv) one or more critical applications require re-activation of the one or more of the transmit chains.

20. A computer program product comprising:

a computer readable storage device; and program code on the computer readable storage device that when executed by a processor associated with a communication device, the program code enables the communication device to provide functionality of:

configuring a communications subsystem of the communication device in a first configuration to communicate an uplink with a base node in one of transmit diversity (TxDiv) mode and multiple input multiple output (MIMO) mode in a single layer mode of an uplink data stream using at least a first and a second transmit chains of more than one transmit chains;

monitoring at least one of a direct or an indirect measure of uplink signal quality of the uplink data stream while connected to the base node in the single layer mode via at least the first and the second transmit chains;

determining whether the communication device is in a second transmit power region that requires the total transmit power for the uplink being equal to or less than the transmit power capability of at least one of the transmit chains;

deactivating one or more of the transmit chains, leaving at least one transmit chain active in a second configuration, in response to either: (i) a measure of uplink signal quality indicating unsatisfactory signal quality; or (ii) determining that the communication device is in the second transmit power region that requires the total transmit power for the uplink being equal to or less than the transmit power capability of at least one of the transmit chains; and in response to a subsequent measure of uplink signal quality indicating unsatisfactory signal quality after deactivating the one or more transmit chains, re-activating the one or more of the transmit chains that were inactivated to return to the first configuration.

* * * * *